(12) United States Patent
Yamamoto et al.

(10) Patent No.: US 8,726,696 B2
(45) Date of Patent: May 20, 2014

(54) METHOD OF MANUFACTURING GLASS SUBSTRATE, AND STIRRING DEVICE

(75) Inventors: Kohei Yamamoto, Sayama (JP); Hitoshi Gekko, Yokkaichi (JP)

(73) Assignee: AvanStrate Inc., Mie (JP)

( * ) Notice: Subject to any disclaimer, the term of this patent is extended or adjusted under 35 U.S.C. 154(b) by 0 days.

(21) Appl. No.: 13/610,747

(22) Filed: Sep. 11, 2012

(65) Prior Publication Data

US 2013/0000358 A1 Jan. 3, 2013

Related U.S. Application Data

(63) Continuation of application No. PCT/JP2011/075174, filed on Nov. 1, 2011.

(30) Foreign Application Priority Data

Nov. 1, 2010 (JP) ................................. 2010-245209

(51) Int. Cl.
*C03B 5/187* (2006.01)

(52) U.S. Cl.
USPC ........................................................ 65/135.3

(58) Field of Classification Search
USPC ........................................................ 65/135.3
See application file for complete search history.

(56) References Cited

U.S. PATENT DOCUMENTS

| | | | |
|---|---|---|---|
| 2,569,459 A | 10/1951 | Voe | |
| 2,569,549 A | 10/1951 | Barrick | |
| 2,570,078 A | 10/1951 | Spremulli | |
| 2,570,079 A | 10/1951 | Spremulli | |
| 2,746,729 A * | 5/1956 | Eakins | 65/135.4 |
| 2,762,167 A | 9/1956 | Voe | |
| 2,831,664 A | 4/1958 | Spremulli | |
| 3,419,373 A | 12/1968 | Gould et al. | |
| 5,340,372 A | 8/1994 | Macedo et al. | |
| 5,573,564 A * | 11/1996 | Richards | 65/29.13 |
| 2003/0101750 A1 | 6/2003 | Goller et al. | |
| 2008/0151687 A1 | 6/2008 | Adelsberg et al. | |
| 2009/0025428 A1 | 1/2009 | Naumann et al. | |
| 2009/0282872 A1 | 11/2009 | Tomamoto et al. | |
| 2011/0032791 A1 | 2/2011 | Singer | |

FOREIGN PATENT DOCUMENTS

| | | |
|---|---|---|
| DE | 10 2008 017 045 A1 | 10/2009 |
| GB | 639772 A | 7/1950 |
| JP | 58-88126 A | 5/1983 |

(Continued)

OTHER PUBLICATIONS

Extended European Search Report dated Feb. 21, 2014 issued in European Application No. 11838022.9.

*Primary Examiner* — Queenie Dehghan
(74) *Attorney, Agent, or Firm* — Sughrue Mion, PLLC

(57) ABSTRACT

A stirring device 100 comprises a chamber 101, and a stirrer 102 for stirring molten glass 7 in the chamber 101. The stirrer 102 has a shaft 105 as a rotation axis, and blades 106*a*-106*e* disposed in a plurality of tiers on a side wall of the shaft 105. The blades 106*a*-106*e* have support plates 108 and ancillary plates 109. The ancillary plates 109 create, in the molten glass 7, a flow in the radial direction of the shaft 105.

17 Claims, 16 Drawing Sheets

(56) References Cited

FOREIGN PATENT DOCUMENTS

| | | | |
|---|---|---|---|
| JP | 63-8226 | A | 1/1988 |
| JP | 2005-511462 | A | 4/2005 |
| JP | 2009-29704 | A | 2/2009 |
| JP | 2010-100462 | A | 5/2010 |
| JP | 2011-178656 | A | 9/2011 |
| WO | 2009121684 | A1 | 10/2009 |
| WO | 2011/020625 | A1 | 2/2011 |

* cited by examiner

METHOD OF MANUFACTURING GLASS SUBSTRATE, AND STIRRING DEVICE

This is a Continuation of Application No. PCT/JP2011/075174 filed Nov. 1, 2011, which claims benefit to Japanese Patent Application No. 2010-245209 filed Nov. 1, 2010, the contents of all of which are incorporated herein by reference in their entirety.

TECHNICAL FIELD

The present invention relates to a method of manufacturing a glass substrate, and to a stirring device.

BACKGROUND ART

In processes for high-volume production of glass articles such as plate glass, the glass material is heated to produce molten glass, and the molten glass so produced is molded to manufacture glass articles such as plate glass. If the molten glass is heterogeneous, striae may form in the glass articles. Striae are zones of striated appearance differing in refractive index and/or specific gravity from the surrounding area; in optical components such as lenses, substrates for liquid crystal displays (LCD), and other such applications, there is a need to rigorously eliminate them from the glass articles. Particularly in the case of glass substrates for displays, of which substrates for liquid crystal displays are representative, it is necessary to keep striae to extremely low levels throughout the entire large area of the surface. Stirring of the molten glass by a stirring device is performed in order to prevent striae. A typical stirring device is provided with a chamber of round cylindrical shape, and a stirrer. The stirrer has a shaft serving as a rotation axis, and blades connected to the side wall of the shaft. The molten glass is introduced into the chamber in which the stirrer is disposed, and the molten glass is stirred by the blades, rendering the molten glass homogeneous.

Patent Document 1 (Japanese Unexamined Patent Application Publication S63-8226) discloses a stirrer having a shaft serving as a rotation axis, and blades connected to the side wall of the shaft. The blades of the stirrer disclosed in Patent Document 1 are inclined with respect to the stirrer axis, and thereby create a flow of the molten glass towards the upward direction or downward direction of the chamber, enhancing the stirring effect.

Patent Document 2 (Japanese Unexamined Patent Application Publication S58-88126) likewise discloses a stirrer having a shaft serving as a rotation axis, and blades connected to the shaft so that the faces thereof are inclined in the circumferential direction (rotation direction) of the shaft. This shaft is provided with several tiers of blades in the lengthwise direction of the shaft, with blades of adjacent tiers inclined in opposite directions. Between the blades of adjacent tiers, there arise two glass flows, i.e., glass flow arising from downward pushing of the molten glass, and glass flow arising from upward pushing of the molten glass, and these flows collide. It is conceivable that higher stirring effect can be obtained, as compared with a case in which the molten glass flows in one direction only.

SUMMARY OF THE INVENTION

Technical Problem

In the prior art, various stirring devices have been proposed with the object of stirring molten glass. However, these prior art stirring devices cannot be said to have sufficient capability to stir molten glass, and there exists a need for a stirring device capable of stirring molten glass in a more homogeneous manner.

With the foregoing in view, it is an object of the present invention to provide a method of manufacturing a glass substrate and a stirring device whereby molten glass can be stirred in a more homogeneous manner.

Solution to Problem

A method of manufacturing a glass substrate according to the present invention comprises: a melting step for melting a glass material and obtaining molten glass; a stirring step for stirring, inside a stirred tank, the molten glass obtained in the melting step; and a molding step for molding a glass substrate from the molten glass stirred in the stirring step. The stirred tank comprises a chamber for directing the molten glass downward from above or upward from below, and a stirrer for stirring the molten glass inside the chamber. The stirrer has a shaft serving as a rotation axis disposed along the vertical direction, and blades disposed on a side wall of the shaft, in a plurality of tiers from the uppermost tier to the lowermost tier along the axial direction of the shaft. The blades have support plates extending orthogonally to the axial direction of the shaft, and ancillary plates disposed on a principal surface of the support plates. In the stirring step, the stirrer rotates about the shaft as the rotation axis, whereby the ancillary plates create, in the molten glass, a flow in the radial direction of the shaft, and the ancillary plates positioned between the support plates of the blades disposed in two adjacent tiers create, in the molten glass, a flow in the same direction.

According to this method of manufacturing a glass substrate, rotation of the stirrer causes the molten glass inside the chamber to be raked towards the shaft by the ancillary plates, or pushed towards the inner wall of the chamber. Specifically, flow in the radial direction of the shaft arises in the molten glass. In so doing, the molten glass is moved in the radial direction of the shaft (the outside direction and the inside direction) while being directed downward from above or upward from below inside the chamber. Consequently, with this method of manufacturing a glass substrate, the molten glass can be stirred more homogeneously, without the need for a complex configuration.

A method of manufacturing a glass substrate according to the present invention comprises: a melting step for melting a glass material and obtaining molten glass; a stirring step for stirring, inside a stirred tank, the molten glass obtained in the melting step; and a molding step for molding a glass substrate from the molten glass stirred in the stirring step. The stirred tank comprises a chamber for directing the molten glass downward from above or upward from below, and a stirrer for stirring the molten glass inside the chamber. The stirrer has a shaft serving as a rotation axis disposed along the vertical direction, and blades disposed on a side wall of the shaft, in a plurality of tiers from the uppermost tier to the lowermost tier along the axial direction of the shaft. The blades have support plates extending orthogonally to the axial direction of the shaft, and ancillary plates disposed on a principal surface of the support plates. In the stirring step, the stirrer rotates about the shaft as the rotation axis, whereby the ancillary plates arranged on the upper principal surfaces of the support plates of the blade positioned in the uppermost tier create, above the support plates of the blade positioned in the uppermost tier, a first flow moving the molten glass from the inner wall of the chamber towards the shaft, and create a second flow ascending the molten glass moved by the first flow along the side wall of the shaft.

According to this method of manufacturing a glass substrate, by rotating the stirrer, an ascending flow of molten glass is formed at the periphery of the shaft, and a descending flow of molten glass is formed along the inner wall of the chamber. For this reason, the molten glass is drawn from the periphery of the shaft, and does not descend within the chamber. Therefore, a phenomenon whereby bubbles and/or a silica-rich layer that are present in proximity to the liquid level of the molten glass inside the chamber during the operation is sucked into the molten glass and flows out from the chamber can be minimized. Additionally, the ascending flow and descending flow of the molten glass minimize stagnation of the molten glass in proximity to the liquid level of the molten glass. Consequently, with this method of manufacturing a glass substrate, the molten glass can be stirred more homogeneously.

The stirring device according to the present invention comprises a chamber for directing molten glass downward from above or upward from below, and a stirrer for stirring the molten glass inside the chamber. The stirrer has a shaft serving as a rotation axis, and blades disposed on a side wall of the shaft, in a plurality of tiers from the uppermost tier to the lowermost tier along the axial direction of the shaft. The blades have support plates directly connected to the shaft, and ancillary plates disposed on a principal surface of the support plates. The ancillary plates have one edge connected to the shaft or closest to the shaft, and another edge positioned on the opposite side from the one edge. The ancillary plates, when viewed along the axial direction of the shaft, are arranged so as to diverge from a straight line connecting the one edge and a center point that is the center of rotation of the shaft, while moving from the one edge towards the another edge. The stirrer rotates about the shaft as the rotation axis, whereby the ancillary plates create, in the molten glass, a flow in the radial direction of the shaft, and the ancillary plates positioned between the support plates of the blades disposed in two adjacent tiers create, in the molten glass, a flow in the same direction.

According to this stirring device, by rotating the stirrer, the molten glass inside the chamber is raked towards the shaft by the ancillary plates, or pushed towards the inner wall of the chamber. Specifically, flow in the radial direction of the shaft arises in the molten glass. In so doing, the molten glass is moved in the radial direction of the shaft (the outside direction and the inside direction) while being directed downward from above or upward from below inside the chamber. Consequently, this stirring device can stir molten glass more homogeneously.

Advantageous Effects of Invention

The method of manufacturing a glass substrate and the stirring device according to the present invention can stir molten glass more homogeneously.

DESCRIPTION OF EMBODIMENTS

First Embodiment (1) Overall Configuration of Glass Manufacturing Device

Figure 1:
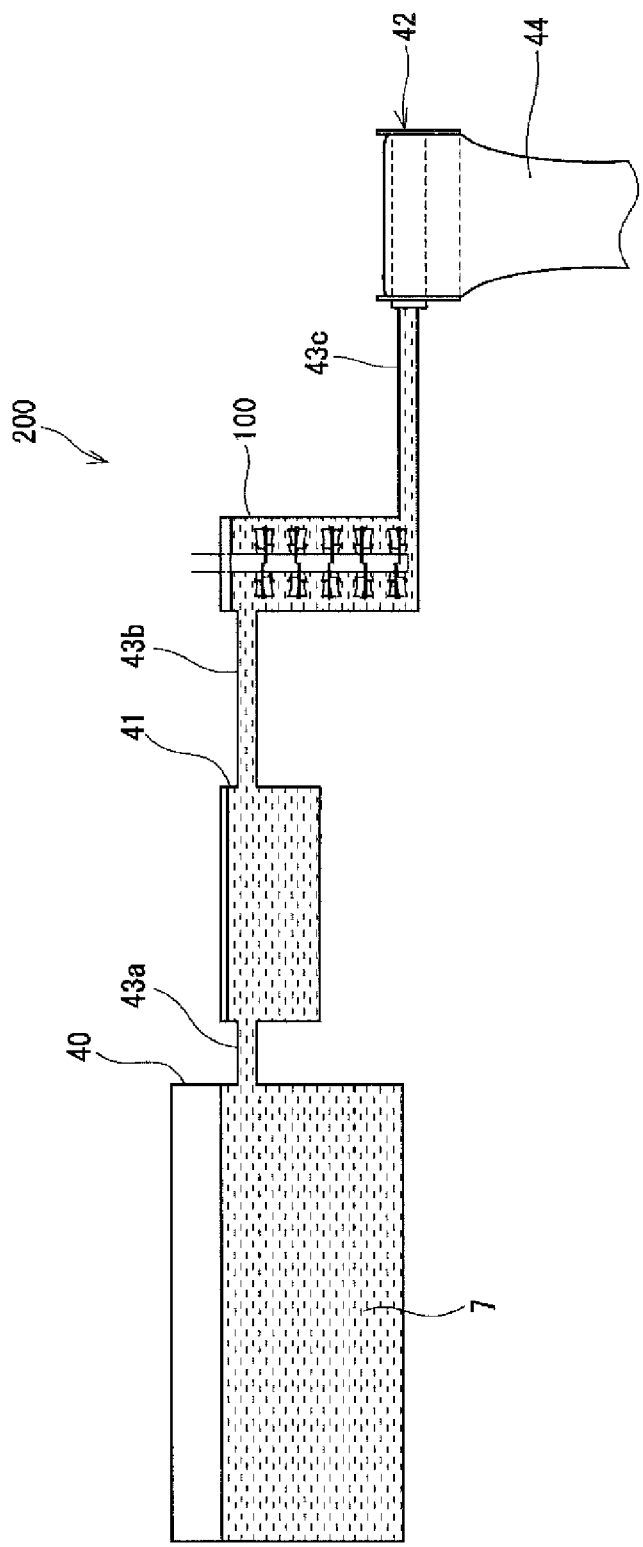
FIG. 1 is a schematic showing an example of a configuration of a glass manufacturing device according to a first embodiment.

A first embodiment of a glass manufacturing device employing the method of manufacturing a glass substrate and the stirring device according to the present invention will be described employing FIGS. 1 to 9. FIG. 1 is a generic view showing an example of a configuration of a glass manufacturing device 200. The glass manufacturing device 200 is provided with a melting tank 40; a fining tank 41; a stirring device 100; a molding device 42; and conduits 43*a*, 43*b*, 43*c* connecting these. Molten glass 7 produced in the melting tank 40 flows through the conduit 43*a* and into the fining tank 41; after fining in the fining tank 41 flows through the conduit 43*b* and into the stirring device 100; and after being stirred homogeneously in the stirring device 100, flows through the conduit 43*c* and into the molding device 42, where a glass ribbon 44 is molded by a downdraw method.

Heating means such as a burner or the like (not shown) is arranged in the melting tank 40, so that a glass material can be melted to obtain the molten glass 7. The glass material may be adjusted appropriately to obtain the desired glass. For example, the glass material may be prepared so as to obtain glass having substantially the following composition, expressed as mass percent.

| | |
|---|---|
| $SiO_2$ | 57-65% |
| $Al_2O_3$ | 15-19% |
| $B_2O_3$ | 8-13% |
| MgO | 1-3% |
| CaO | 4-7% |
| SrO | 1-4% |
| BaO | 0-2% |
| $Na_2O$ | 0-1% |
| $K_2O$ | 0-1% |
| $As_2O_3$ | 0-1% |
| $Sb_2O_3$ | 0-1% |
| $SnO_2$ | 0-1% |
| $Fe_2O_3$ | 0-1% |
| $ZrO_2$ | 0-1% |

Herein, "substantially" means that the presence of trace amounts of components within a range of less than 0.1 mass % is permissible. Consequently, it is permissible for the glass having the aforedescribed composition to have admixed therein trace amounts of other components, within a range of less than 0.1 mass %. The proportions of $Fe_2O_3$, $As_2O_3$, $Sb_2O_3$, and $SnO_2$ in the aforedescribed composition are values derived through conversion, treating all of the components Fe, As, Sb, or Sn having plural valence as $Fe_2O_3$, $As_2O_3$, $Sb_2O_3$, or $SnO_2$.

The glass material prepared in the aforedescribed manner is charged to the melting tank 40. The melting tank 40 melts the glass material at a temperature set according to the composition thereof, to obtain molten glass 7 at a temperature of 1500° C. or above, for example.

The molten glass 7 obtained in the melting tank 40 passes from the melting tank 40 through the conduit 43a and flows into the fining tank 41. Heating means (not shown) comparable to that of the melting tank 40 is arranged in the fining tank 41. The fining tank 41 further raises the temperature of the molten glass 7 to bring about fining. In specific terms, in the fining tank 41, the temperature of the molten glass 7 is raised to 1550° C. or above, and further to 1600° C. or above. Fining of the molten glass 7 is brought about by the rise in temperature.

The fined molten glass 7 in the fining tank 41 passes from the fining tank 41 through the conduit 43b and flows into the stirring device 100. During passage through the conduit 43b, the molten glass 7 cools, and in the stirring device 100 is stirred at a lower temperature than in the fining tank 41. As one example of parameters for the stirring step in the case of an alkali-free glass and/or low-alkali glass as such as the aforedescribed, stirring is preferably performed with the temperature of the molten glass set to within the range of 1400° C.-1550° C., and with the viscosity of the molten glass adjusted to within the range of 2500 poise-450 poise. The molten glass 7 is stirred and homogenized in the stirring device 100.

The molten glass 7 having been homogenized by the stirring device 100 passes from the stirring device 100 through the conduit 43c and flows into the molding device 42. During passage through the conduit 43c, the molten glass 7 cools, cooling to a temperature suitable for molding (for example, 1200° C.). In the molding device 42, the molten glass 7 is molded by the downdraw method. The molten glass 7 flowing into the molding device 42 spills out over the top of the molding device 42 and flows downward along the side wall of the molding device 42. A continuous glass ribbon 44 is molded thereby. The glass ribbon 44 is cooled slowly as it moves downward, and finally is cut into plate glass of the desired size.

(2) Configuration of Stirring Device

Figure 2:
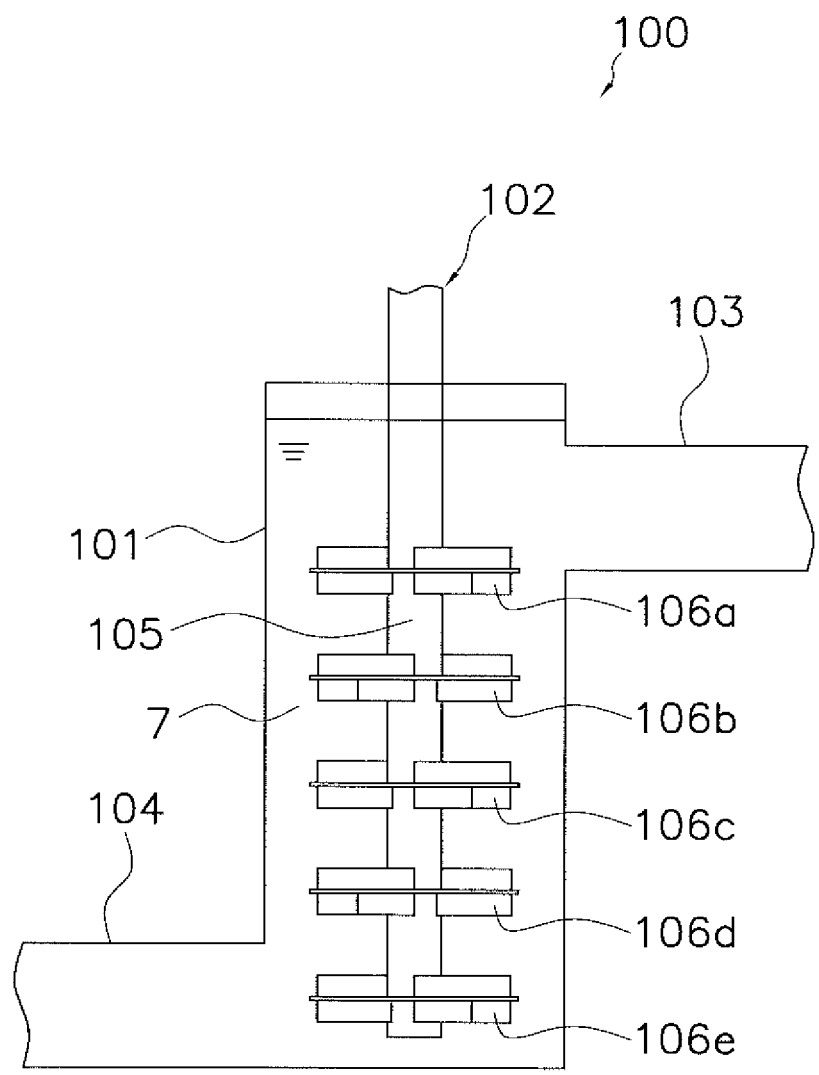
FIG. 2 is a side view showing an example of a configuration of a stirring device according to the first embodiment.

FIG. 2 is a side view showing an example of a configuration of the stirring device 100. The stirring device 100 is provided with a chamber 101, and a stirrer 102 housed inside the chamber 101. The chamber 101 is cylindrical in shape, and communicates with an upstream conduit 103 arranged at the upper side wall, and a downstream conduit 104 arranged at the lower side wall. The molten glass 7 flows into the chamber 101 in the horizontal direction from the upstream conduit 103, is directed from above to below in the vertical direction inside the chamber 101, and flows out in the horizontal direction from the inside of the chamber 101 to the downstream conduit 104.

The stirrer 102 is provided with a shaft 105 of cylindrical post shape adapted for axial rotation; and blades 106a, 106b, 106c, 106d, 106e connected to the side wall of the shaft 105. The shaft 105 is disposed inside the chamber 101, such that the rotation axis thereof lies along the vertical direction. The blades 106a to 106e are disposed in order at equidistant intervals from above to below along the axial direction (direction of the rotation axis) of the shaft 105. Specifically, in the stirrer 102, the blades 106a to 106e are disposed in five tiers along the axial direction of the shaft 105.

Figure 3:
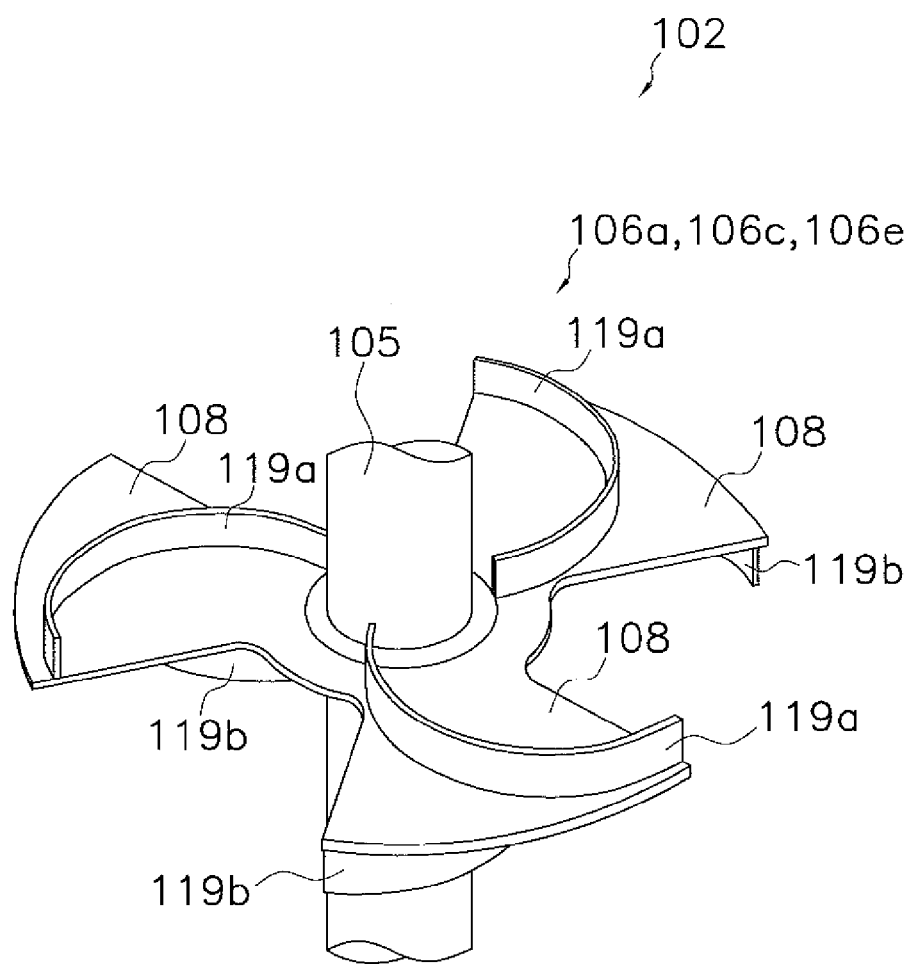
FIG. 3 is a perspective view of a blade of a stirrer according to the first embodiment.
Figure 4:
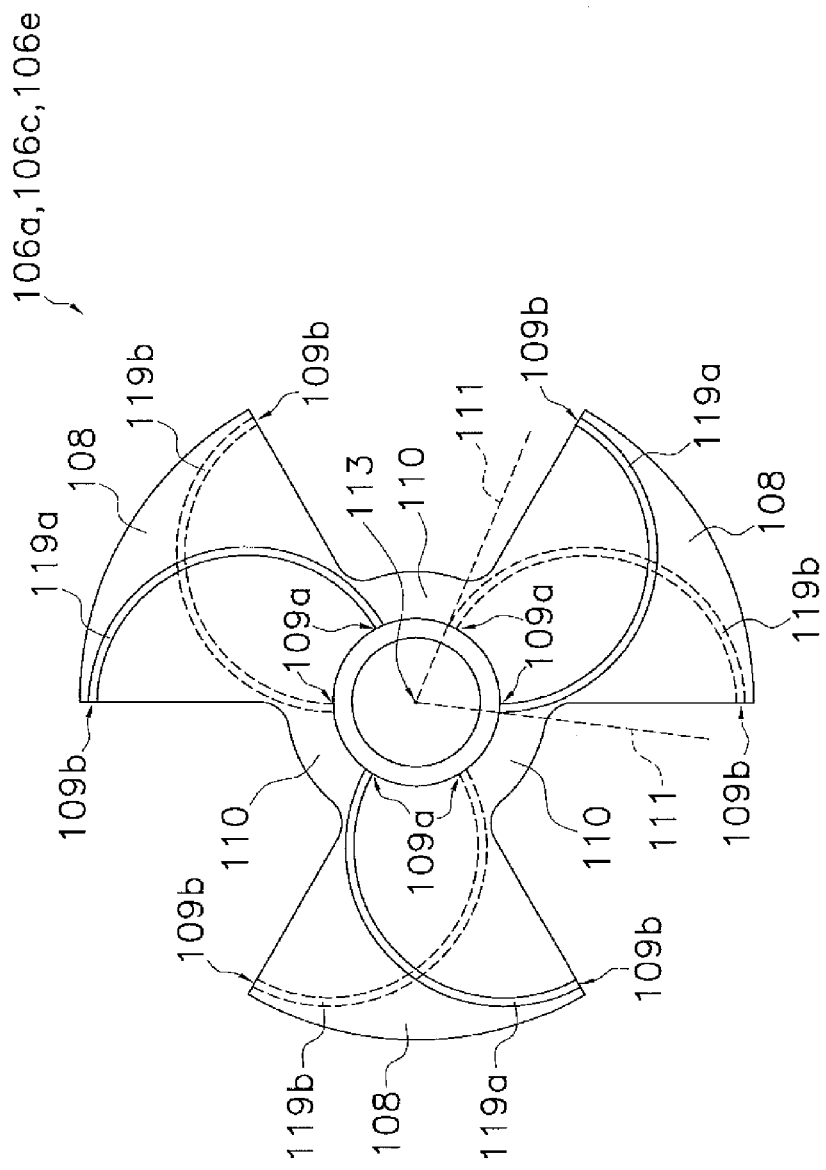
FIG. 4 is a plan view of a blade of the stirrer according to the first embodiment.
Figure 5:
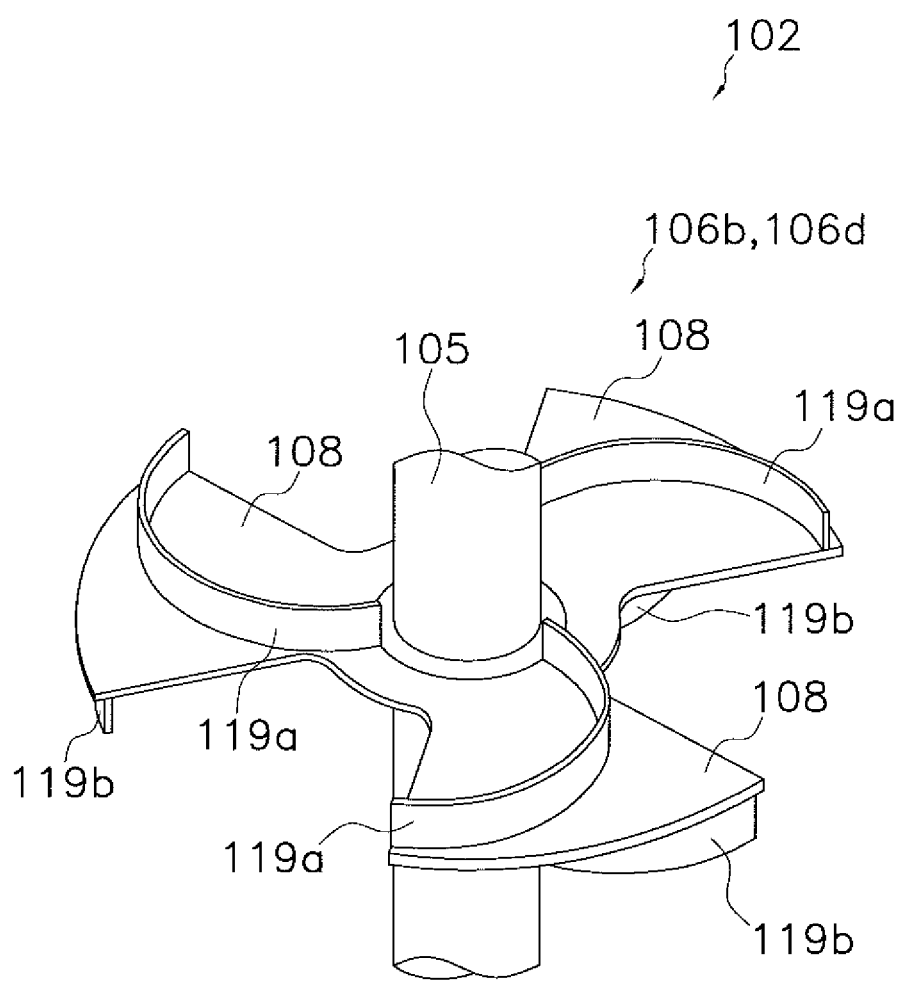
FIG. 5 is a perspective view of a blade of the stirrer according to the first embodiment.
Figure 6:
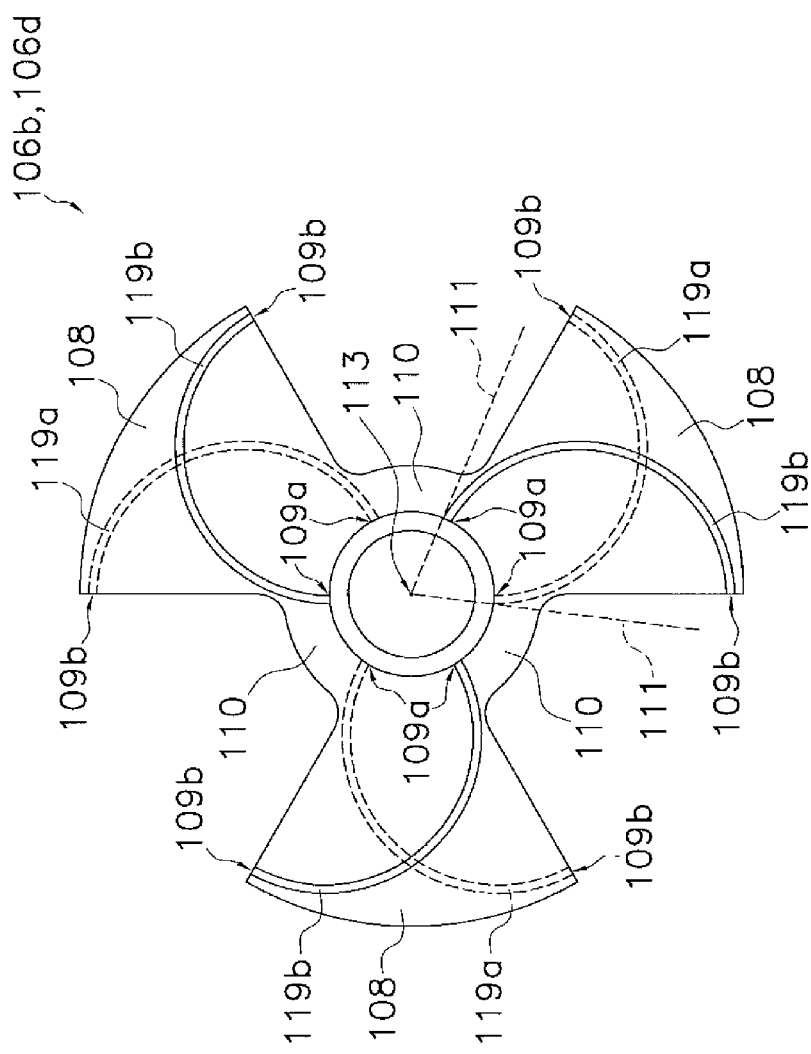
FIG. 6 is a plan view of a blade of the stirrer according to the first embodiment.

Next, the configuration of the blades 106a to 106e will be described with reference to FIGS. 3 to 6. In the present embodiment, the blades 106a, 106c, and 106e have mutually identical shape, and the blades 106b and 106d have mutually identical shape. FIG. 3 and FIG. 4 are, respectively, a perspective view and a plan view of the blades 106a, 106c, and 106e, when viewed along the rotation axis of the shaft 105. FIG. 5 and FIG. 6 are, respectively, a perspective view and a plan view of the blades 106b and 106d, when viewed along the rotation axis of the shaft 105.

The blades 106a to 106e are arranged radially towards the outside in the radial direction of the shaft 105. Each of the blades 106a to 106e is composed of three support plates 108 orthogonal to the axial direction of the shaft 105; one upper ancillary plate 119a disposed on the upper principal surface of each support plate 108; and one lower ancillary plate 119b disposed on the lower principal surface of each support plate 108. Herein, the upper ancillary plates 119a and the lower ancillary plates 119b shall be referred to collectively as the ancillary plates 109.

When the blades 106a to 106e are seen in plan view, the three support plates 108 are directly connected to the side wall of the shaft 105 at three symmetrical positions with respect to the rotation axis of the shaft 105. Each support plate 108 is connected to the shaft 105 such that the normal line of the principal surface thereof lies along the axial direction of the shaft 105. Specifically, each support plate 108 is disposed on the horizontal. As shown in FIGS. 3 to 6, the three support plates 108 of each of the blades 106a to 106e are connected to one another by linking portions 110 along the periphery of the shaft 105. Specifically, the three support plates 108 are substantially configured as a single part.

Figure 7:
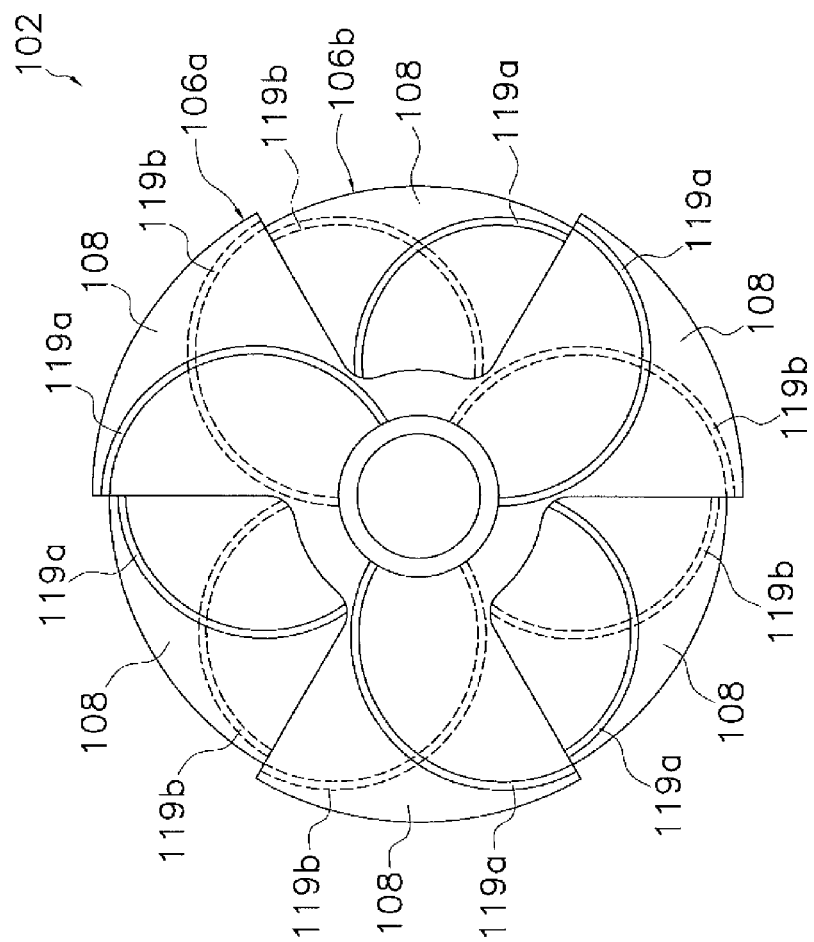
FIG. 7 is a diagram depicting the positional relationship of two blades of the stirrer according to the first embodiment.

The three support plates 108 are arranged radially from the shaft 105 towards the inside wall of the chamber 101; and are disposed such that, when the support plates 108 of the blades 106a to 106e disposed in two adjacent tiers are respectively projected onto the bottom face of the chamber 101, the gaps between the first support plates 108 and the other support plates 108 are small. In specific terms, the support plates 108 of two blades 106a to 106e adjacently situated along the axial direction of the shaft 105 are disposed so with no mutual overlap, when viewed along the rotation axis of the shaft 105. As an example, FIG. 7 represents the positional relationship of the blade 106a and the blade 106b, when the stirrer 102 is seen in top view along the rotation axis of the shaft 105. As shown in FIG. 7, the support plates 108 of the blade 106a are disposed to be positioned between the support plates 108 of the blade 106b. Specifically, the six support plates 108 of the blade 106a and the blade 106b are disposed at six symmetrical positions with respect to the rotation axis of the shaft 105.

The ancillary plates 109 are disposed on principal surfaces of the support plates 108, such that the principal surfaces thereof are perpendicular to the principal surfaces of the support plates 108. The ancillary plates 109 are disposed on the upper principal surface and lower principal surface of the support plates 108. As mentioned previously, the upper ancillary plates 119a are disposed on the upper principal surfaces of the support plates 108, and the lower ancillary plates 119b are disposed on the lower principal surfaces of the support plates 108. In FIGS. 4 and 6, the lower ancillary plates 119b are shown by broken lines.

The ancillary plates 109 are disposed towards the outside peripheral rim of the support plates 108 from the shaft 105. Herein, each ancillary plate 109 has an inside edge 109a which is the edge on the side closest to the shaft 105, and an outside edge 109b which is the edge situated at the opposite side from the inside edge 109a and on the side closest to the outside peripheral rim of the support plate 108. Each ancillary plate 109 is disposed such that, moving from the inside edge 109a towards the outside edge 109b, the principal surfaces thereof diverge from a straight line 111 connecting the inside edge 109a and a center point 113 where the rotation axis of the shaft 105 is positioned. In specific terms, for the blades 106a, 106c, and 106e, when the stirrer 102 is seen in top view as shown in FIG. 4, the upper ancillary plates 119a are arranged such that the principal surfaces thereof diverge from the straight lines 111 in the counterclockwise direction, while the lower ancillary plates 119b are arranged such that the principal surfaces thereof diverge from the straight lines 111 in the clockwise direction. On the other hand, for the blades 106b and 106d, when the stirrer 102 is seen in top view as shown in FIG. 6, the upper ancillary plates 119a are arranged such that the principal surfaces thereof diverge from the straight lines 111 in the clockwise direction, while the lower ancillary plates 119b are arranged such that the principal surfaces thereof diverge from the straight lines 111 in the counterclockwise direction. Specifically, in each of the blades 106a to 106e, the upper ancillary plates 119a and the lower ancillary plates 119b are arranged to extend in mutually opposite directions. Pairs of ancillary plates 109 between two of the blades 106a to 106e that are situated adjacently along the rotation axis of the shaft 105 are arranged with the principal surfaces thereof diverging from the straight lines 111, in the same direction as one another. For example, the lower ancillary plates 119b of the blade 106a and the upper ancillary plates 119a of the blade 106b are arranged such that the principal surfaces thereof diverge from the straight lines 111 in the clockwise direction.

The ancillary plates 109 are disposed such that the connecting portion of the principal surface thereof to the principal surface of the support plate 108 is not positioned in an edge of the support plate 108. Specifically, when the blades 106a to 106e are viewed along the rotation axis of the shaft 105, the ancillary plates 109 are arranged at positions away from the outside peripheral rim of the support plates 108, except for the inside edge 109a and outside edge 109b.

(3) Operation of Stirring Device

Figure 8:
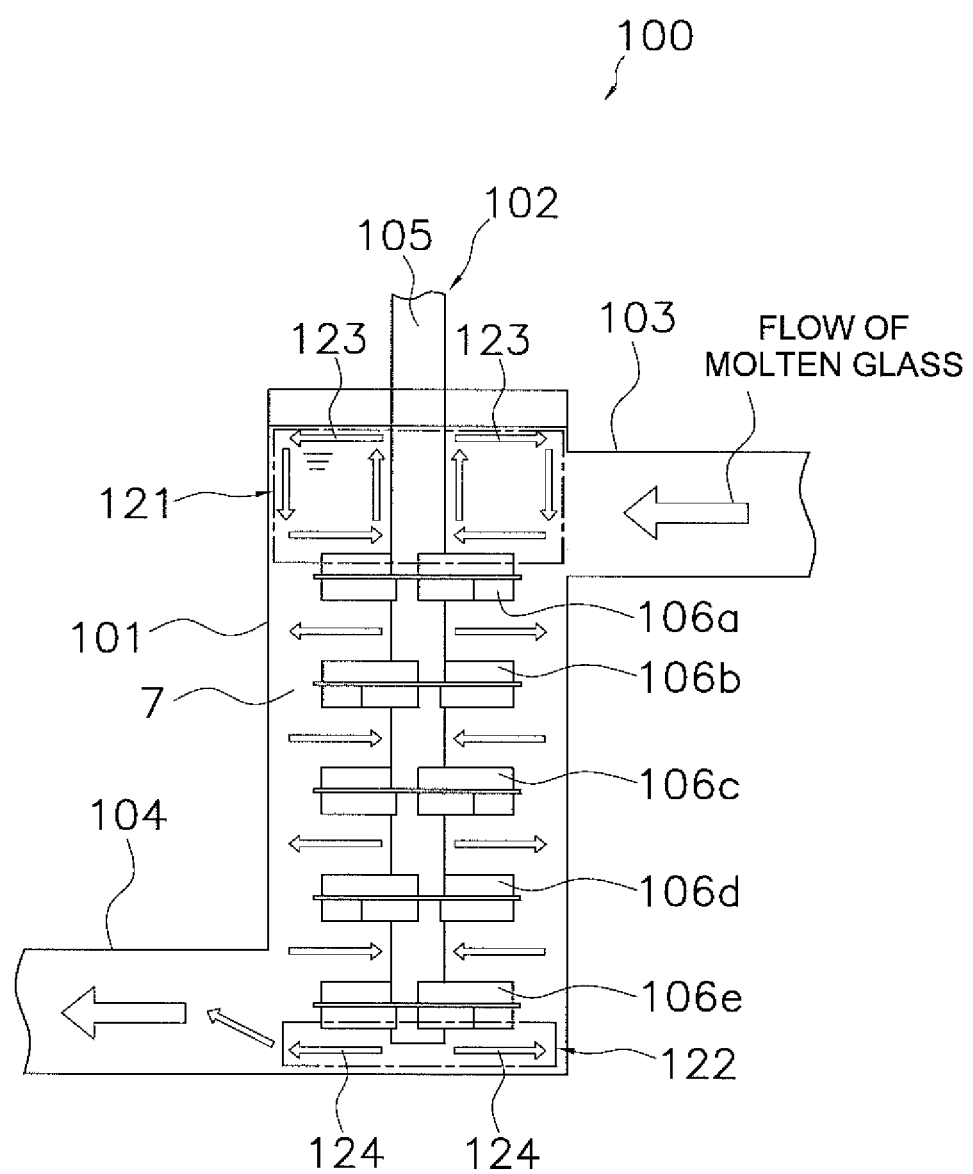
FIG. 8 is a diagram depicting flows of molten glass in the stirring device according to the first embodiment.

The operation of the stirring device 100 according to the present embodiment will be described with reference to FIG. 8. FIG. 8 is a diagram depicting flows of molten glass 7 in the stirring device 100. Inside the chamber 101, the molten glass 7 flows in from the upstream conduit 103 in the horizontal direction. The upper end of the shaft 105 of the stirrer 102 is linked to an external motor or the like, and the stirrer 102 rotates counterclockwise as seen from above, with the shaft 105 as the rotation axis. Inside the chamber 101, the molten glass 7 is stirred by the stirrer 102 while being gradually directed from towards the bottom from the top. The stirred molten glass 7 flows out from inside the chamber 101 in the horizontal direction and into the downstream conduit 104.

Inside the chamber 101, the molten glass 7 is stirred by rotation of the blades 106a to 106e about the shaft 105 as the rotation axis. In specific terms, the ancillary plates 109 in each of the blades 106a to 106e rake the molten glass 7 towards the shaft 105 from the inner wall of the chamber 101, and also push it from the shaft 105 towards the inner wall of the chamber 101. In the present embodiment, in each of the blades 106a to 106e, either the upper ancillary plates 119a or the lower ancillary plates 119b rake the molten glass 7 towards the shaft 105 from the inner wall of the chamber 101, while the others push the molten glass 7 from the shaft 105 towards the inner wall of the chamber 101. Specifically, above the support plates 108 and below the support plates 108 in each of the blades 106a to 106e, the flows of the molten glass 7 in the radial direction of the shaft 105 are mutually opposite. For two of the blades 106a to 106e that are situated adjacently along the rotation axis of the shaft 105, the lower ancillary plates 119b of the blade positioned in the upper tier, and the upper ancillary plates 119a positioned in the lower tier, diverge in the same direction from the straight lines 111 at the principal surfaces thereof. Therefore, the flows of the molten glass 7 in the radial direction of the shaft 105 produced by a pair of mutually opposed ancillary plates 109 will share the same direction.

As shown in FIG. 8, in the present embodiment, the upper ancillary plates 119a of the blade 106a positioned in the uppermost tier of the shaft 105 create a flow raking the molten glass 7 from the inner wall of the chamber 101 towards the shaft 105. Because of this, the lower ancillary plates 119b of the blade 106a and the upper ancillary plates 119a of the blade 106b positioned one tier below create a flow pushing the molten glass 7 from the shaft 105 towards the inner wall of the chamber 101. Similarly, the lower ancillary plates 119b of the blade 106b and the upper ancillary plates 119a of the blade 106c create a flow raking the molten glass 7 from the inner wall of the chamber 101 towards the shaft 105. The lower ancillary plates 119b of the blade 106e positioned in the lowermost tier then create a flow pushing the molten glass 7 from the shaft 105 towards the inner wall of the chamber 101. Specifically, in the lower space 122 between the blade 106e positioned in the lowermost tier and the bottom face of the chamber 101, the molten glass 7 flows in the direction of the arrow 124 shown in FIG. 8.

As shown in FIG. 8, in the present embodiment, through axial rotation of the stirrer 102, above the support plates 108 of the blade 106a positioned in the uppermost tier, the upper ancillary plates 119a of the blade 106a create a flow moving the molten glass 7 from the inner wall of the chamber 101 towards the shaft 105. The upper ancillary plates 119a of the blade 106a further give rise to ascending flow of the molten glass 7 along the side wall of the shaft 105. The molten glass 7 having risen into proximity with the liquid level of the molten glass 7 flows towards the inner wall of the chamber 101 from the shaft 105, and then descends along the inner wall of the chamber 101. Specifically, in the upper space 121 between the blade 106a positioned in the uppermost tier and the liquid level of the molten glass 7, the molten glass 7 forms a circulating flow 123 as shown in FIG. 8. The molten glass 7 in the upper space 121 is stirred by this circulating flow 123.

(4) Characteristics (4-1)

In the stirring device 100 according to the present embodiment, through axial rotation of the stirrer 102, between any two adjacent blades 106a to 106e, the molten glass 7 flowing into the chamber 101 from the upstream conduit 103 is raked from the inner wall of the chamber 101 towards the shaft 105, or pushed from the shaft 105 towards the inner wall of the chamber 101. The flow of the molten glass 7 in the radial direction of the shaft 5 switches between opposite directions in each of the tiers, going from the downward from above inside the chamber 101. Specifically, the molten glass 7 is stirred by alternating movement in the radial direction of the shaft 5, while being directed from the top towards the bottom inside the chamber 101.

Consequently, the stirring device 100 according to the present embodiment can more homogeneously stir the molten glass 7, without the need to provide a complex configuration. For this reason, the occurrence of striae can be minimized, and a high-quality glass product can be obtained.

(4-2)

In the stirring device 100 according to the present embodiment, the ancillary plates 109 are arranged on the upper principal surfaces and the lower principal surfaces of the support plates 108 in each of the blades 106a to 106e. With axial rotation of the stirrer 102, the molten glass 7 flowing inside the chamber 101 is imparted by the ancillary plates 109 with motion in the radial direction of the shaft 105. In specific terms, the molten glass 7 in proximity to the support plates 108 is raked or pushed by the ancillary plates 109, and thereby moves in the radial direction along the principal surfaces of the support plates 108. Due to a configuration in which the ancillary plates 109 are placed on the support plates 108, the molten glass 7 moves in the radial direction along the principal surfaces of the support plates 108, both with respect to raking and to pushing movement in the radial direction. In so doing, the molten glass 7 is sufficiently stirred by the ancillary plates 109 in each of the blades 106a to 106e.

Consequently, the stirring device 100 according to the present embodiment can more homogeneously stir the molten glass 7, without the need to provide a complex configuration. For this reason, the occurrence of striae can be minimized, and a high-quality glass product can be obtained.

(4-3)

In the present embodiment, the upper ancillary plates 119a of the blade 106a positioned in the uppermost tier of the shaft 105 gives rise to flow raking the molten glass 7 from the inner wall of the chamber 101 towards the shaft 105. In this case, in the upper space 121 between the blade 106a positioned in the uppermost tier and the liquid level of the molten glass 7, an ascending flow of the molten glass 7 forms at the periphery of the shaft 105, and a descending flow of the molten glass 7 forms along the inner wall of the chamber 101. The circulating flow 123 shown in FIG. 8 is thereby formed in the upper space 121 of the molten glass 7.

If the configuration were not one with the blade 106a positioned in the uppermost tier of the shaft 105 rakes the molten glass 7 in the radial direction, for example, in the case of a configuration in which the support plates 108 are not provided with the ancillary plates 109, or in the case of a configuration in which the direction of rotation of the stirrer 102a is the opposite direction from that in the present embodiment, so that the molten glass 7 is pushed in the radial direction, the molten glass 7 above the blade 106a positioned in the uppermost tier would be pushed in the radial direction by the ancillary plates 109 and/or by the centrifugal force received by the support plates 108, thereby pushing it from the shaft 105 towards the inner wall of the chamber 101. In this case, the pushed molten glass 7 would ascend along the inner wall of the chamber 101 and flow into the upper space 121. Specifically, the molten glass 7 pushed in the radial direction, in the course of movement thereof along the inner wall of the chamber 101, would be directed toward the top of the chamber 101 which is the direction in which it more readily flows, and thereafter reach the liquid level of the molten glass 7. The molten glass 7 reaching the liquid level of the molten glass 7 along the inner wall of the chamber 101 would then be directed across the liquid level towards the shaft 105 from the inner wall of the chamber 101, ultimately forming a flow directed along the shaft 105 and towards the bottom of the chamber 101. Specifically, there would arise a circulating flow of the molten glass 7 in the opposite direction of the circulating flow 123 in the present embodiment.

In a case in which circulating flow of the molten glass 7 in the opposite direction has arisen, bubbles present on the surface of the molten glass 7, and/or a silica-rich layer in which the silica component has become relatively large as a result of or volatilization of readily-volatilized components, is sucked in by the descending flow of the molten glass 7 formed at the periphery of the shaft 105 as it draws in the molten glass 7 in proximity to the liquid level toward the bottom of the chamber 101. As a result, there is a risk of exacerbating bubbles and of exacerbating striae in the manufactured glass substrate.

Consequently, according to the present embodiment, by forming an ascending flow of the molten glass 7 at the periphery of the shaft 105, thereby causing the molten glass 7 in the upper space 121 to rapidly descend along the side wall of the shaft 105, situations of outflow from the downstream conduit 104 in a state of insufficient stirring can be minimized.

According to the present embodiment, by forming a circulating flow 123 of the molten glass 7 in the upper space 121, stagnation of the molten glass 7 in proximity to the liquid level of the molten glass 7 can be minimized.

Consequently, the stirring device 100 according to the present embodiment can stir the molten glass 7 more homogeneously. For this reason, the occurrence of striae can be minimized, and high-quality glass articles can be obtained.

(4-4)

In the present embodiment, in the lower space 122 between the blade 106e positioned in the lowermost tier and the bottom face of the chamber 101, the molten glass 7 is pushed from the shaft 105 towards the inner wall of the chamber 101. Specifically, the lower ancillary plates 119b of the blade 106e give rise in the molten glass 7 to flow towards the outside in the radial direction of the shaft 105 (arrow 124 in FIG. 8), so as to accelerate outflow of molten glass 7 into the downstream conduit 104. Meanwhile, the upper ancillary plates 119a of the blade 106e and the lower ancillary plates 119b of the blade 106d positioned one tier above the blade 106e give rise in the molten glass 7 to flow towards the inside in the radial direction of the shaft 105, so as to minimize the outflow of molten glass 7 into the downstream conduit 104.

In the present embodiment, for this reason, the stirred molten glass 7 flows out into the downstream conduit 104 from the lower space 122, whereby stagnation of the molten glass 7 in the bottom part inside the chamber 101 can be minimized. If the molten glass 7 were to stagnate in the bottom part inside the chamber 101, the stagnated molten glass 7 might include heterogeneous material in which the compositional components are out of balance with respect to the composition of the molten glass 7 flowing inside the chamber 101. Such molten glass 7 stagnating in the bottom part inside the chamber 101 might include heterogeneous material such as a zirconia-rich layer of nonhomogeneous composition, or the like. If molten glass 7 containing heterogeneous material flows out from the downstream conduit 104, striae may occur in the glass ribbon 44 molded by the molding device 42, posing a risk of problems in terms of product quality. Also, if the molten glass 7 including heterogeneous material in which zirconia has become concentrated to high concentration due to stagnation should flow to the molding device 42 in a subsequent step, this may cause devitrification to occur in the molding device 42, so that not only do quality problems arise, but stable operation becomes difficult, and in a worst case scenario, the operation must be halted to perform maintenance.

In the present embodiment, outflow of the molten glass 7 into the downstream conduit 104 from the space above the lower space 122 is minimized. For this reason, the molten glass 7 in the lower space 122 is constantly replenished by the molten glass 7 above, thereby minimizing stagnation of the molten glass 7 in the bottom part inside the chamber 101. Specifically, the molten glass 7 is stirred in a reliable manner in each tier, without short-cutting through tiers of the spaces between adjacent support plates 108. Situations in which insufficiently stirred molten glass 7 flows out from the stirring device 100 can be minimized thereby.

As shown in FIG. 8, in the present embodiment, the upstream conduit 103 is disposed in the vicinity of the heightwise position of the blade 106a positioned in the uppermost tier. The heightwise position of the blade 106a positioned in the uppermost tier set to be separated by a predetermined distance from the liquid level of the molten glass 7. If the heightwise position of the blade 106a is close to the liquid level, when the liquid level of the molten glass 7 is vibrated by the rotation of the stirrer 102, bubbles and the like floating on the liquid level are readily drawn into the molten glass 7. On the other hand, if the heightwise position of the blade 106a is distant from the liquid level, the circulating current 123 of the molten glass 7 cannot reach the vicinity of the liquid level, and the molten glass 7 will grow stagnant in the vicinity of the liquid level, as a result of which nonhomogeneous molten glass 7 will stagnate in the vicinity of the liquid level. Accordingly, the heightwise position of the blade 106a with respect to the liquid level of the molten glass 7 is determined appropriately, depending on the rotation speed of the stirrer 102 and/or the size of the blades 106a to 106e.

Additionally, in the present embodiment, the flow rate of the molten glass 7 is set in such a way that the liquid level of the molten glass 7 is positioned in the vicinity of the apical part of the upstream conduit 103; and the support plates of the blade 106a are arranged in the lower side of the center of the diameter of the upstream conduit 103. In more specific terms, as shown in FIG. 8, the support plates of the blade 106a are arranged at a heightwise position about the same as that of the bottom part of the upstream conduit 103. For this reason, the upper ancillary plates 119a of the blade 106a positioned in the uppermost tier give rise in the molten glass 7 to flow in the radial direction of the shaft 105 (the arrow to the lower side of the circulating flow 123 in FIG. 8), so as to accelerate inflow of the molten glass 7 from the upstream conduit 103.

Consequently, the stirring device 100 according to the present embodiment can stir the molten glass 7 more homogeneously. For this reason, the occurrence of striae can be minimized, and high-quality glass articles can be obtained.

(4-5)

In the present embodiment, the support plates 108 of the any two of the blades 106a to 106e situated adjacently along the rotation axis of the shaft 105 are disposed without mutual overlap, when viewed along the rotation axis of the shaft 105. For example, as shown in FIG. 7, the support plates 108 of the blade 106a are disposed so as to be positioned between two support plates 108 of the blade 106b. For this reason, flow of the molten glass 7 in the axial direction of the shaft 105 (the vertical direction) inside the chamber 101 is inhibited, and the residence time of the molten glass 7 inside the chamber 101 is increased. In other words, upward or downward flow of the molten glass 7 inside the chamber 101 is initially dammed by the support plates 108 in each of the blades 106a to 106e, and therefore in the spaces between adjacent blades 106a to 106e, the molten glass 7 temporarily stagnates. For this reason, in the spaces between adjacent support plates 108, the molten glass 7 is imparted with sufficient movement in the radial direction of the shaft 105 by the ancillary plates 109 in each of the blades 106a to 106e, and a molten glass 7 short path does not occur.

In the present embodiment, by adopting such a disposition of the blades 106a to 106e, the molten glass 7 in the upper space 121 is made to descend rapidly along the side wall of the shaft 105, and situations of outflow from the downstream conduit 104 in a state of insufficient stirring can be minimized.

Consequently, the stirring device 100 according to the present embodiment can stir the molten glass 7 more homogeneously. For this reason, the occurrence of striae can be minimized, and high-quality glass articles can be obtained.

(4-6)

In the stirring device 100 according to the present embodiment, when the stirrer 102 is viewed along the rotation axis of the shaft 105, the ancillary plates 109 in each of the blades 106a to 106e are arranged at positions away from the outside peripheral rims of the support plates 108, except for their inside edge 109a and outside edge 109b. For this reason, the molten glass 7 flowing vertically downward in along the principal surfaces of the upper ancillary plates 109a of the blades 106a to 106e readily collides with the principal surfaces at the upper sides of the support plates 108, and the molten glass 7 flowing vertically upward along the principal surfaces of the lower ancillary plates 109a of the blades 106a to 106e readily collides with the principal surfaces at the lower sides of the support plates 108, whereby movement of the molten glass 7 in the upward and downward directions inside the chamber 101 is minimized. Specifically, in the tiers between mutually adjacent blades 106a to 106e, the support plates 108 have an initial damming action on the molten glass 7 flowing downward from above or upward from below, inside the chamber 101. As a result, in the tiers of spaces between adjacent support plates 108, the molten glass 7 is sufficiently stirred by the ancillary plates 109 of the blades 106a to 106e, and a molten glass 7 short path does not arise.

Consequently, the stirring device 100 according to the present embodiment can stir the molten glass 7 more homogeneously. For this reason, the occurrence of striae can be minimized, and high-quality glass articles can be obtained.

(4-7)

In the present embodiment, the three support plates 108 in each of the blades 106a to 106e of the stirrer 102 are connected to one another by the linking portions 110 at the periphery of the shaft 105, and therefore constitute substantially one component. For this reason, the strength of the blades 106a to 106e can be improved. Due to the minimal stirring effect at the periphery of the shaft 105, around the shaft 105, the molten glass 7 tends to descend inside the chamber 101 without being stirred. In the present embodiment, descending flow of the molten glass 7 around the shaft 105 can be minimized by the linking portions 110 in each of the blades 106a to 106e.

Consequently, the stirring device 100 according to the present embodiment can stir the molten glass 7 more homogeneously. For this reason, the occurrence of striae can be minimized, and high-quality glass articles can be obtained.

(5) Modification Examples (5-1) Modification Example A

In the present embodiment, the blades 106a to 106e are disposed in five tiers on the shaft 105, but the number of tiers of the blades 106a to 106e may be determined appropriately in consideration of the size of the chamber 101, and/or the length of the shaft 105, and so on. Likewise, the spacing between two of the blades 106a to 106e situated adjacently along the shaft 105 may be determined appropriately in consideration of the size of the chamber 101, and so on.

(5-2) Modification Example B

In the present embodiment, each of the blades 106a to 106e have three support plates 108, but may instead have two, or four or more, support plates 108.

In the present modification example, in a case in which, for example, each of the blades 106a to 106e is constituted by four support plates 108, the positions of the support plates 108 of adjacent blades 106a to 106e may differ from one another when the stirrer 102 is viewed in the axial direction of the shaft 105, in the manner taught in the present embodiment.

(5-3) Modification Example C

Figure 9:
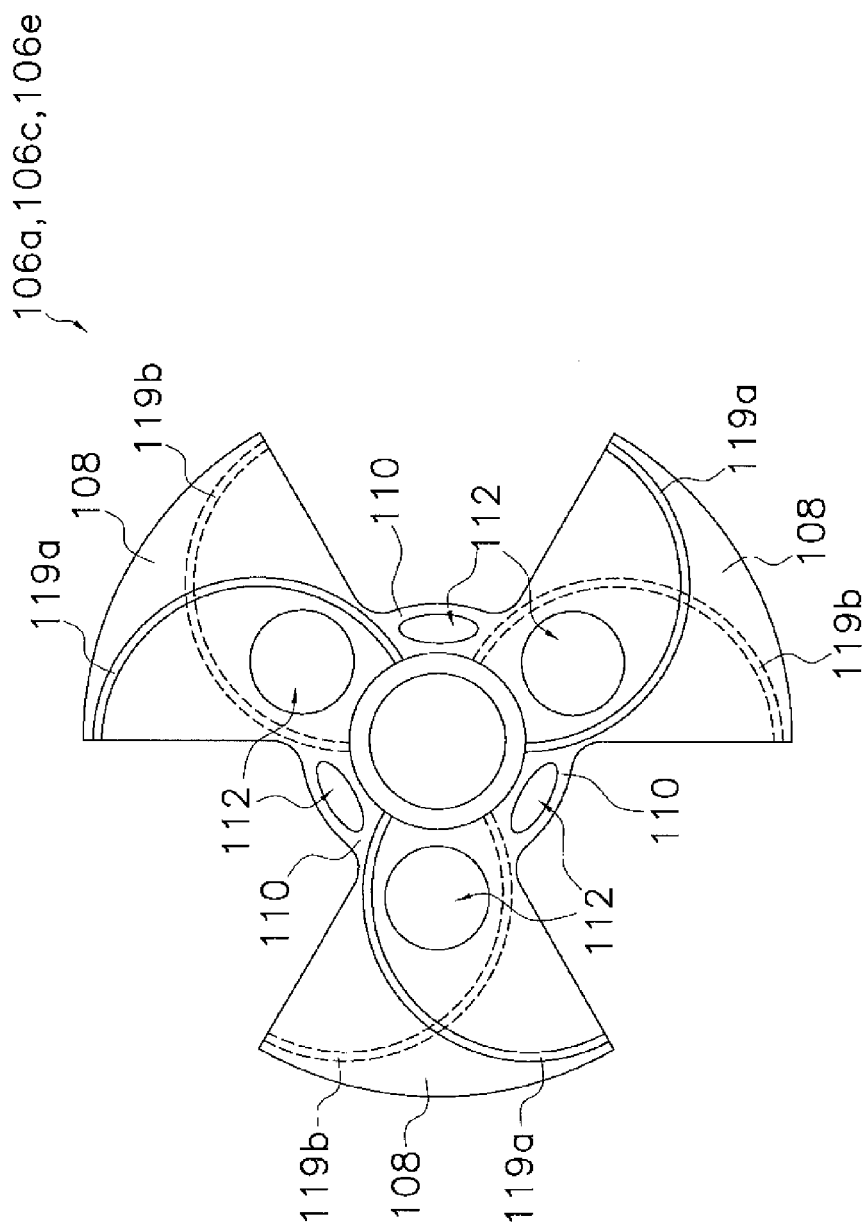
FIG. 9 is a top view of a blade of a stirrer according to a modification example C of the first embodiment.

Through-holes 112 may be formed in the principal surfaces of the support plates 108 in each of the blades 106a to 106e in the present embodiment. FIG. 9 is a plan view of a blade 106a, 106c, or 106e having through-holes 112. In the present modification example, when the stirrer 102 rotates about the shaft 105 as the rotation axis, a portion of the molten glass 7 will pass through the through-holes 112. A portion of the molten glass 7 passing through the through-holes 112 gives rise to upward or downward flow of the molten glass 7. As a result, in the molten glass 7 in the chamber 101, there arises flow in the axial direction of the shaft 105 due to the through-holes 112, in addition to flow in the radial direction of the shaft 105 due to the ancillary plates 109. For this reason, more complex flows arise in the molten glass 7, and higher stirring effect can be obtained. Moreover, due to the through-holes 112, the resistance received from the molten glass 7 during rotation of the stirrer 102 can be expected to be lower, and less power will be needed to give rise to the intended flow in the molten glass 7.

Moreover, in the present modification example, bubbles included in the molten glass 7 can pass through the through-holes 112 and rise to the liquid level of the molten glass 7 in the chamber 101. Specifically, bubbles included in the molten glass 7 can be eliminated effectively. For example, there can be considered cases in which the stirrer 102 of the present modification example provided with through-holes 112 would be introduced into the molten glass 7 in the chamber 101, during inspection or repair of the stirrer 102, and/or during use of a new stirrer 102. In such a case, bubbles of air sucked in due to introduction of the stirrer 102 would be able to float not only between the blades 106a to 106e and the blades 106a to 106e of the stirrer 102, but also through the through-holes 112 placed in the blades 106a to 106e. For this reason, it is possible to shorten the time necessary for operation to stabilize.

As shown in FIG. 9, in the present modification example, through-holes 112 may be formed the linking portions 110 connecting the support plates 108 to one another around the shaft 105 as well.

(5-4) Modification Example D

In the stirring device 100 according to the present embodiment, the chamber 101 may be provided with a mechanism for discharging the molten glass 7. For example, a discharge port for discharging molten glass 7 that includes a zirconia-rich layer may be placed on the bottom face of the chamber 101, or a discharge port for discharging molten glass 7 that includes bubbles and/or a silica-rich layer may be placed on the side wall of the chamber 101.

For example, there may be cases in which heterogeneous material containing a higher proportion of silica or the like, with respect to the average composition of the molten glass 7 overall, is included within the molten glass 7. It is conceivable that this could happen due to irregular composition of the molten glass 7 arising in the melting step, or to volatilization of readily-volatilized components from the molten glass 7. In particular, the aforedescribed heterogeneous material is prone to arise due to volatilization of readily-volatilized components from the molten glass 7 at the liquid level of the molten glass 7.

In a case in which the circulating flow 123 of the present embodiment has arisen, notwithstanding the aforedescribed heterogeneous material, bubbles floating on the liquid level of the molten glass 7, and/or other foreign matter present on the liquid level, the molten glass 7 in proximity to the liquid level flows across the liquid level from the shaft 105 towards the inner wall of the chamber 101. Therefore, as taught in the present modification example, by placing a discharge port on an extension line of this flow, heterogeneous material and the like included in the molten glass 7 can be discharged. For example, at a position above the blade 106a of the uppermost tier, preferably at the liquid level or just below the liquid level of the molten glass 7, the chamber 101 may be provided with a discharge port formed by part of the inner wall of the chamber 101 protruding towards the outside in the radial direction.

Normally, it is necessary to halt running of the stirring device 100 during recovery of foreign matter in the molten glass 7. However, in a case in which the circulating flow 123 is formed at the periphery of the shaft 105, and flow is formed across the liquid level of the molten glass 7 from the shaft 105 towards the inner wall of the chamber 101, by placing the aforedescribed discharge port, molten glass 7 that includes heterogeneous material and the like can be discharged from the chamber 101 without having to halt running of the stirring device 100. For example, even if insufficiently fined molten glass 7 including bubbles flows to the stirring step from the upstream fining step, the molten glass 7 that includes the bubbles can be discharged from the chamber 101 without halting operation, and the stirring device 100 can be kept online.

(5-5) Modification Example E

In the present embodiment, the three support plates 108 are arranged radially from the shaft 105 towards the inner wall of the chamber 101; and are disposed such that when the support plates 108 of the blades 106a to 106e disposed in two adjacent tiers are respectively projected onto the bottom face of the chamber 101, the gaps between the support plates 108 and the support plates 108 are small. However, the three support plates 108 may be disposed such that, depending on the area of the principal surface, the area of overlapping sections of the support plates 108 and the support plates 108 is small. In this case, the support plates 108 of two of the blades 106a to 106e situated adjacently along the rotation axis of the shaft 105 would be disposed in mutual partially overlapping fashion when viewed along the rotation axis of the shaft 105.

In the present modification example as well, flows of the molten glass 7 in the upward and downward directions inside the chamber 101 are initially dammed by the support plates 108 of the blades 106a to 106e, and therefore in the spaces between adjacent blades 106a to 106e, the molten glass 7 temporarily stagnates. For this reason, in each of the spaces between adjacent support plates 108, the molten glass 7 is imparted with sufficient movement in the radial direction of the shaft 105 by the ancillary plates 109 of the blades 106a to 106e, and short-path of the molten glass 7 does not occur.

(5-6) Modification Example F

In the present embodiment, the inside edges 109a of the ancillary plates 109 are separated from the shaft 105; however, the ancillary plates 109 may directly connect to the shaft 105 in order to improve the strength of the stirrer 102 and the blades 106a to 106e.

(5-7) Modification Example G

The method of manufacturing a glass substrate according to the present invention is not limited to the glass compositions mentioned in the present embodiment, nor are the temperature and/or viscosity of the molten glass 7 in the stirring step limited to the aforedescribed values. For example, whereas the aforedescribed glass composition was shown to be a glass composition of alkali-free glass or low-alkali glass suited for employment in glass substrates for liquid crystals, the aforedescribed stirring step is effective for glasses containing an alkali component as well.

Likewise, the parameters of the stirring step are not limited to the aforedescribed values. As one example, for a glass composition suitable for reinforced glass formed by addition of an alkali component, stirring may take place at a lower temperature set for the molten glass 7, i.e., within a range of 1300° C.-1400° C., and with the viscosity of the molten glass 7 adjusted to within the aforedescribed range.

Second Embodiment

A second embodiment of a glass manufacturing device employing the method of manufacturing a glass substrate and the stirring device according to the present invention will be described employing FIGS. 10 to 20. The basic configuration, operation, and characteristics of the glass manufacturing device according to the present embodiment are the same as for the glass manufacturing device according to the first embodiment.

Figure 10:
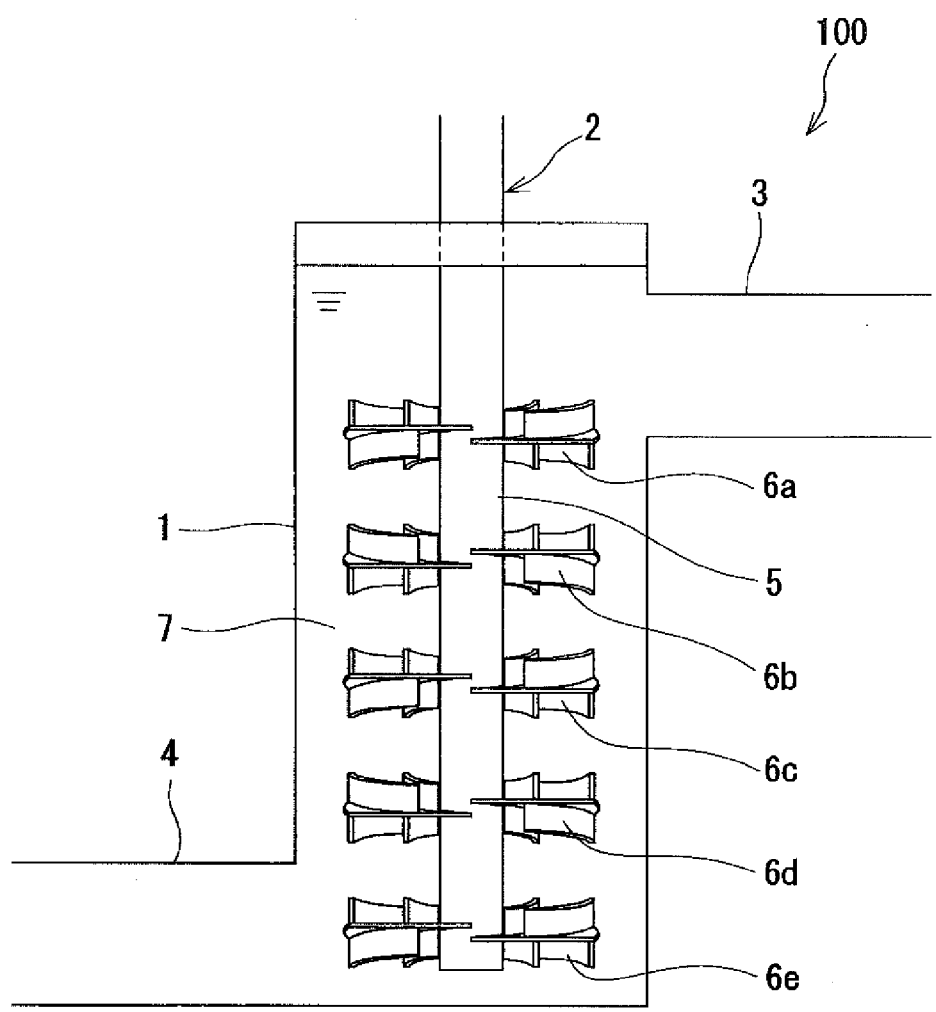
FIG. 10 is a side view showing an example of a configuration of a stirring device according to a second embodiment.
Figure 11:
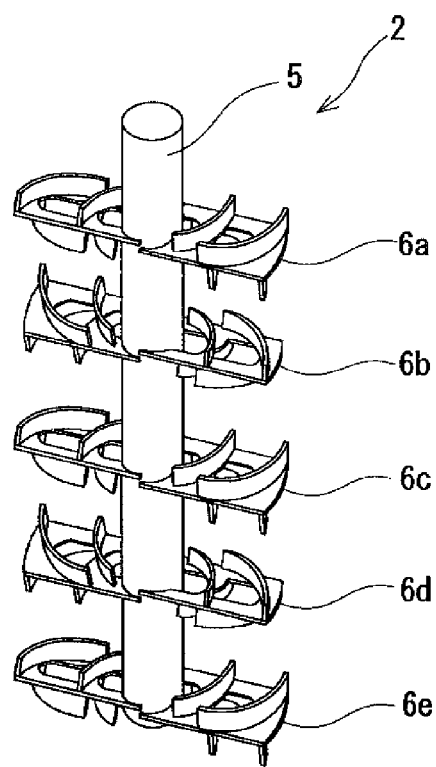
FIG. 11 is a perspective view showing an example of a configuration of a stirrer according to a second embodiment.

FIG. 10 is a side view showing an example of a configuration of a stirring device according to the present embodiment; and FIG. 11 is a perspective view showing an example of a configuration of a stirrer according to the present embodiment. The stirring device 100 is provided with a chamber 1, and a stirrer 2 housed inside the chamber 1. The chamber 1 is cylindrical in shape, and communicates with an upstream conduit (inlet pipe) 3 and a downstream conduit (outlet pipe) 4, which are arranged at the upper side wall and the lower side wall. The molten glass 7 flows into the chamber 1 from the upstream conduit 3, is directed from the top towards the bottom, and flows out from the chamber 1 to the downstream conduit 4.

The stirrer 2 is provided with a shaft 5 with a cylindrical shape constituting a rotation axis; and blades 6a, 6b, 6c, 6d, 6e connected to the side wall of the shaft 5. The blades 6a to 6e are disposed in order, in five tiers along the axial direction of the shaft 5. The number of tiers of the blades 6a to 6e is not limited to five; an appropriate preferred number of tiers may be selected in consideration of the size of the chamber 1, and/or the length of the shaft 5, and so on. Likewise, the spacing between the adjacent blades 6a to 6e along the axial direction of the shaft 5 may be adjusted for efficient stirring of the molten glass 7 in the chamber 1. The blades 6a to 6e are disposed extending in a radial pattern in the radial direction of the shaft 5, and in each of the tier, two of the blades 6a to 6e are arranged extending in mutually symmetrical directions with respect to the shaft 5. The number of blades 6a to 6e in each of the tier is not limited to two, and could be one, or three or more, for example.

Figure 12:
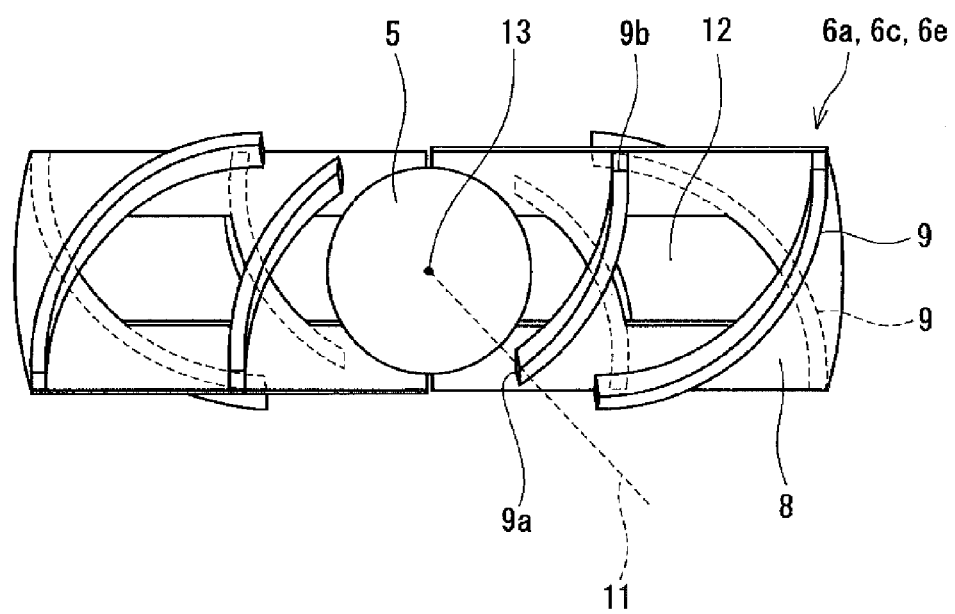
FIG. 12 is a plan view showing an example of a blade configuration in the stirrer according to the second embodiment.
Figure 13:
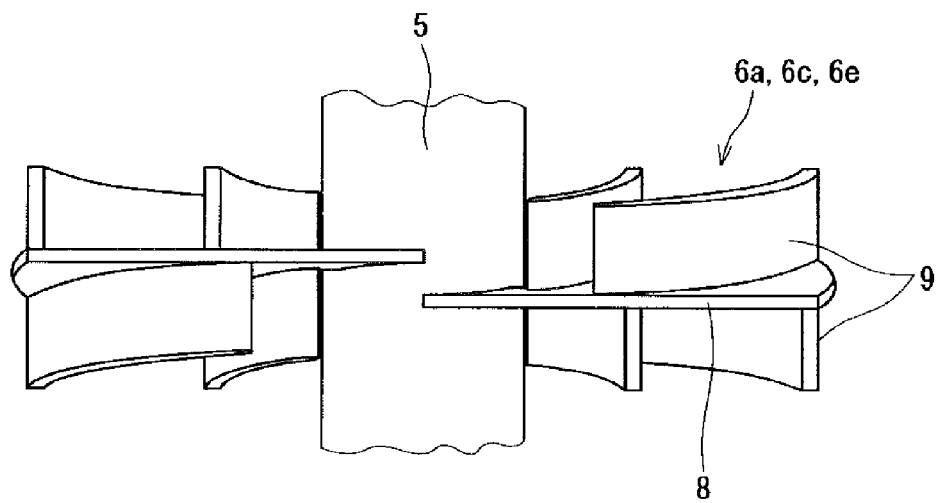
FIG. 13 is a side view showing an example of a blade configuration in the stirrer according to the second embodiment.
Figure 14:
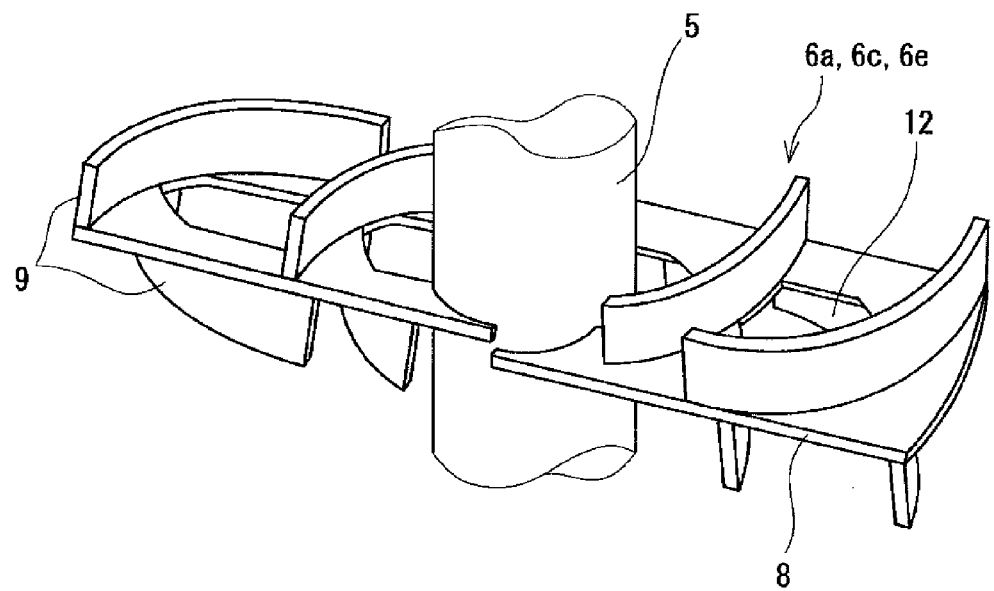
FIG. 14 is a perspective view showing an example of a blade configuration in the stirrer according to the second embodiment.
Figure 15:
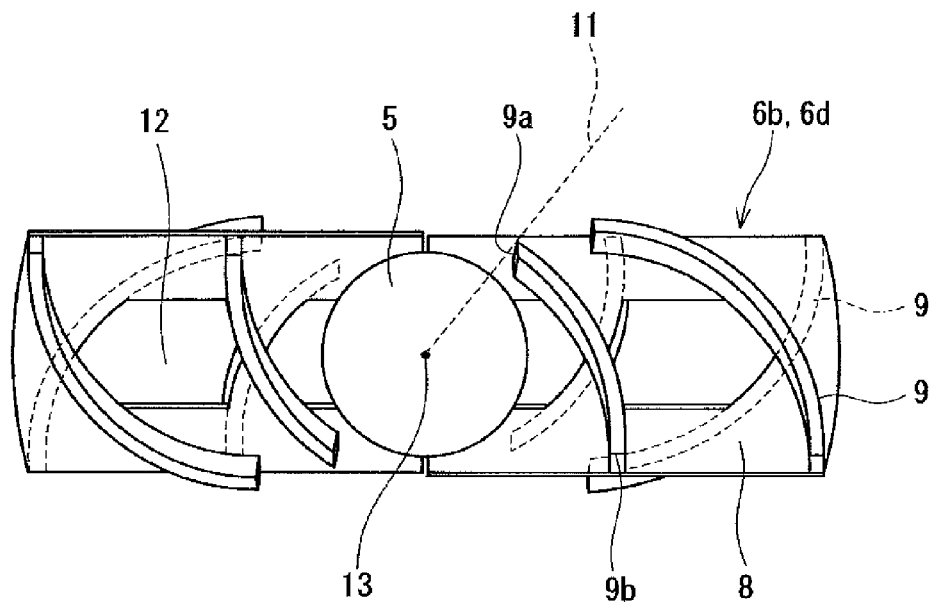
FIG. 15 is a plan view showing an example of another blade configuration in the stirrer according to the second embodiment.
Figure 16:
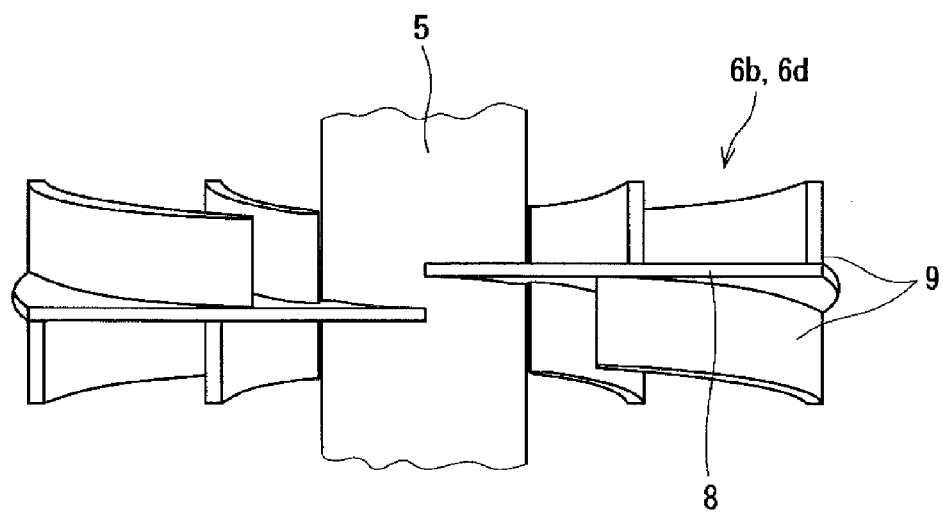
FIG. 16 is a side view showing an example of another blade configuration in the stirrer according to the second embodiment.
Figure 17:
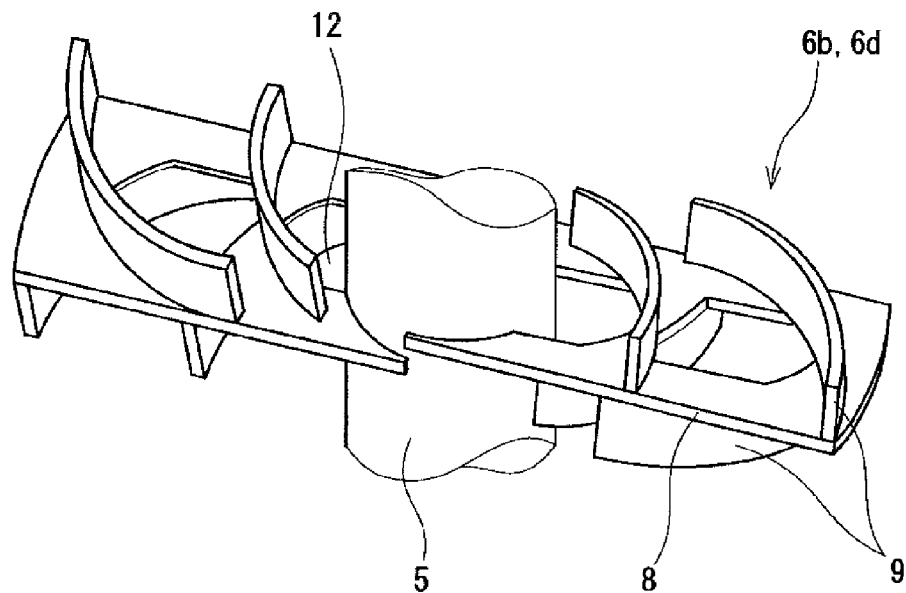
FIG. 17 is a perspective view showing an example of another blade configuration in the stirrer according to the second embodiment.

The configuration of the blades will be described with reference to FIGS. 12 to 17. FIGS. 12, 13, and 14 are respectively a plan view, a side view, and a perspective view showing an example of a blade configuration in the stirrer according to the present embodiment. FIGS. 15, 16, and 17 are respectively a plan view, a side view, and a perspective view showing an example of another blade configuration in the stirrer according to the present embodiment. The blades 6a, 6c, and 6e have the configuration shown in FIGS. 12 to 14, and the blades 6b and 6d have the configuration shown in FIGS. 15 to 17.

The blades 6a, 6c, and 6e are identical in shape to one another, and the blades 6b and 6d are identical in shape to one another. The blades 6a to 6e are provided with inclined plates 8 directly connected to the shaft 5, and ancillary plates 9 arranged on principal surfaces of the inclined plates 8. Both the blades 6a, 6c, and 6e and the blades 6b and 6d have the inclined plates 8 and the ancillary plates 9, but the direction of incline and/or the disposition and others thereof differ from one another.

Figure 18:
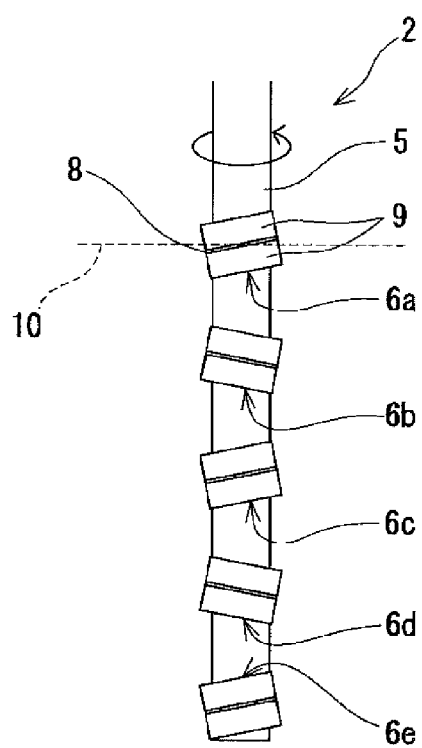
FIG. 18 is a side view showing an example of the configuration of the stirrer according to the second embodiment.

The inclined plates 8 have a mode of pushing the molten glass 7 upward or pushing it downward, when the stirrer 2 rotates about the shaft 5 as the rotation axis. However, the direction along the axial direction of the shaft 5 is the up and down direction. FIG. 18 is a side view showing an example of the configuration of the stirrer according to the present embodiment. FIG. 18 is a view of the stirrer 2 along a direction perpendicular to the axial direction of the shaft 5, with the blades 6a to 6e positioned to the front of the shaft 5. In FIG. 18, the principal surfaces of each inclined plate 8 are inclined with respect to a plane 10 perpendicular to the axial direction of the shaft 5. When the stirrer 2 rotates about the shaft 5 as the rotation axis, the molten glass 7 flows along the principal surfaces of the inclined plates 8, and an upward or downward flow arises in the molten glass 7. The inclined plates 8 push the molten glass 7 upward or push it downward. Any mode whereby the inclined plates 8 push the molten glass 7 upward or downward when the stirrer 2 rotates is acceptable, and the aforedescribed configuration is not limiting. In FIG. 18, the principal surfaces of the inclined plates 8 are flat faces, and the entirety of each principal surface is inclined with respect to the plane 10 perpendicular to the axial direction of the shaft 5; however, for example, a configuration in which only part of each of the inclined plates 8 is inclined with respect to the plane 10 is also acceptable, and the principal surfaces of the inclined plates 8 may be curved faces.

As shown in FIG. 18, the blades 6a, 6c, and 6e differ from the blades 6b and 6d in the direction of incline of the inclined plates 8. For this reason, the directions of the flows arising in the molten glass 7 are different from one another. When the shaft 5 rotates counterclockwise as viewed from above, the inclined plates 8 of the blades 6a, 6c, and 6e push the molten glass 7 downward, whereas the inclined plates 8 of the blades 6b and 6d push the molten glass 7 upward. The directions of the flows arising in the molten glass 7 due to the inclined plates 8 of the blades 6a to 6e differ in alternating fashion along the axial direction of the shaft 5. Consequently, between mutually adjacent tiers of the blades 6a to 6e, both upward and downward flows arise in the molten glass 7. As these two different flows arise, the flows arising in the molten glass 7 become more complex. Furthermore, the two different flows collide between the tiers, producing more complex flows. Higher stirring effect can be obtained thereby, and homogenization of the molten glass 7 is accelerated.

In a preferred mode, the blade 6e of the lowermost tier pushes the molten glass 7 downward when the stirrer 2 rotates in one direction about the shaft 5 as the rotation axis. When downward flow of the molten glass 7 in this section arises due to the blade 6e of the lowermost tier, the molten glass 7 collides with the bottom face of the chamber 1, accelerating stirring of the molten glass 7. The distance between the blade 6e of the lowermost tier and the bottom face of the chamber 1 may be any distance such that the downward flow of the molten glass 7 produced by the blade 6e of the lowermost tier collides with the bottom face of the chamber 1 and accelerates stirring of the molten glass 7.

Through-holes 12 are formed in the principal surfaces of the inclined plates 8. When the stirrer 2 rotates about the shaft 5 as the rotation axis, part of the molten glass 7 passes through the through-holes 12. The through-holes 12 are inclined with respect to the plane 10 in the same manner as the principal surfaces of the inclined plates 8, and therefore give rise to upward or downward flow in the molten glass 7 due to passage of part of the molten glass 7 through the through-holes 12. The directions of these upward or downward flows differ from the directions of the flows arising from upward pushing or downward pushing of the molten glass 7 by the inclined plates 8. Consequently, formation of the through-holes 12 has the effect of increasing the number of directions of flows arising in the molten glass 7. For this reason, more complex flows arise in the molten glass 7, and higher stirring effect can be obtained. Moreover, due to the through-holes 12, resistance received from the molten glass 7 during rotation of the stirrer 2 is lower, and less power is needed to give rise to the intended flow in the molten glass 7.

The ancillary plates 9 are arranged on the principal surfaces of the inclined plates 8, in such a way that the principal surfaces thereof are perpendicular to the principal surfaces of the inclined plates 8. As shown in FIGS. 12 and 15, the two ancillary plates 9 are respectively arranged on the upper principal surface and the lower principal surface of each single inclined plate 8. In FIGS. 12 and 15, the ancillary plates 9 arranged on the lower principal surface are shown by broken lines. Each of the ancillary plates 9 has an edge 9a closest to the shaft 5, and an edge 9b which is the edge on the opposite side from the edge 9a; and has a shape extending from the edge 9a to the edge 9b. Viewed along the axial direction of the shaft 5, each of the ancillary plates 9 has a shape such that, moving from the edge 9a closest to the shaft 5 towards the edge 9b on the opposite side therefrom, the principal surfaces of the ancillary plate 9 diverge from a straight line 11 connecting the edge 9a and a center point 13 which is the center of rotation of the shaft 5. Due to this shape of the ancillary plates 9, when the stirrer 2 rotates about the shaft 5 as the rotation axis, the molten glass 7 flows along the principal surfaces of the ancillary plates 9, giving rise to flow in the molten glass 7 in the radial direction of the shaft 5. That is, flow from the shaft 5 towards the inner wall of the chamber 1, or flow from the inner wall of the chamber 1 towards the shaft 5, arises in the molten glass 7. The ancillary plates 9 have modes of raking the molten glass 7 from the inner wall of the chamber 1 towards the shaft 5, or modes of pushing from the shaft 5 towards the inner wall of the chamber 1. Each of the ancillary plates 9 has either of these two modes. In preferred practice, the ancillary plates 9 respectively arranged on the upper and lower principal surfaces of the inclined plates 8 have mutually different modes.

That is, in a preferred mode, when the stirrer 2 rotates in one direction about the shaft 5 as the rotation axis, of the ancillary plates 9 arranged on the upper principal surfaces and the ancillary plates 9 arranged on the lower principal surfaces of the inclined plates 8, the ancillary plates 9 on one face have a mode of raking the molten glass 7 from the inner wall of the chamber 1 towards the shaft 5, while the ancillary plates 9 on the other face have a mode of pushing the molten glass 7 from the shaft 5 towards the inner wall of the chamber 1.

The ancillary plates 9 arranged on the upper principal surfaces of the inclined plates 8 of the blades 6a, 6c, and 6e have a mode of raking the molten glass 7 when the stirrer 2 rotates about the shaft 5 as the rotation axis in the counterclockwise direction as seen from above; whereas the ancillary plates 9 arranged on the back faces, i.e., the lower principal surfaces thereof, have a mode of pushing the molten glass 7. The ancillary plates 9 arranged on the upper principal surfaces of the inclined plates 8 of the blades 6b and 6d have a mode of pushing the molten glass 7 when the stirrer 2 rotates about the shaft 5 as the rotation axis in the counterclockwise direction as seen from above; whereas the ancillary plates 9 arranged on the back faces, i.e., the lower principal surfaces thereof, have a mode of raking the molten glass 7. Because the modes of the ancillary plates 9 are different for the upper principal surfaces versus the lower principal surfaces of the inclined plates 8 in this way, higher stirring effect is obtained.

Stirring efficiency tends to decline going from the upstream side towards the downstream side of the chamber 1, and in order to minimize this, the height (length in the up and down direction) of the ancillary plates 9 positioned to the downstream side of the chamber 1 may be greater (longer) in comparison with the ancillary plates 9 positioned at the upstream side. Increasing the height of the ancillary plates 9 increases the stirring efficiency, and minimizes the decline in stirring efficiency in the downstream side.

In blades situated adjacently to one another in the axial direction of the shaft 5, the height of the ancillary plates 9 arranged on the upper principal surfaces and the lower principal surfaces of the inclined plates 8 of lower blades may be the same as, or higher than, the height of the ancillary plates 9 arranged on the upper principal surfaces and the lower principal surfaces of the inclined plates 8 of blades positioned above those blades. The ratio of the height of the ancillary plates 9 arranged on the upper principal surfaces and the lower principal surfaces of the blade 6a of the uppermost tier to the height of the ancillary plates 9 arranged on the upper principal surfaces and the lower principal surfaces of the blade 6e of the lowermost tier is preferably 1:1.3.

For example, where the heights of the ancillary plates 9 arranged on each of the inclined plates 8 of the blades 6a, 6b, and 6c positioned on the upper side are equal to one another, and the heights of the ancillary plates 9 arranged on each of the inclined plates 8 of the blades 6d and 6e positioned therebelow are equal to one another, the height of the ancillary plates 9 of the blades 6d and 6e may be 1.3 times higher than the height of the ancillary plates 9 of the blades 6a, 6b, and 6c.

In the present embodiment, the top of the chamber 1 is upstream and the bottom is downstream; however, in a case in which the bottom of the chamber 1 is upstream and the top is downstream, for mutually adjacent blades, the height of the ancillary plates arranged on the upper principal surfaces and the lower principal surfaces of the inclined plates of the blades at the top may be the same as, or greater than, the height of the ancillary plates arranged on the upper principal surfaces and the lower principal surfaces of the inclined plates of the blades positioned below these blades.

Provided that the molten glass 7 can be homogeneously stirred, the number of ancillary plates 9, and the modes thereof are not limited to those in the aforedescribed embodiment. For example, the ancillary plates 9 may be disposed on only one of the principal surfaces of the inclined plates 8. The ancillary plates 9 on both principal surfaces of the inclined plates 8 may have identical modes.

The two ancillary plates (the first ancillary plate and the second ancillary plate) 9 arranged on each of the inclined plates 8 have shapes that respectively diverge from one another moving from the edge 9a towards the edge 9b. The through-hole 12 is formed in the inclined plate 8 between these two ancillary plates 9. Where the mode of these two ancillary plates 9 is one of raking the molten glass 7 from the inner wall of the chamber 1 towards the shaft 5 when the stirrer 2 rotates about the shaft 5 as the rotation axis, the molten glass 7 directed between the two ancillary plates 9 is guided through a progressively smaller gap between the two ancillary plates 9, with a portion thereof flowing through the through-hole 12 and towards the back face of the inclined plate 8, while the remainder flows upward or downward along the principal surfaces of the inclined plate 8. The molten glass 7 having passed through the through-hole 12 differs not only in flow direction but also in velocity from the rest of the molten glass 7, therefore giving rise to more complex flows in the molten glass 7. Furthermore, the molten glass 7 having passed through the through-hole 12 and flowed towards the back face of the inclined plate 8 is pushed from the shaft 5 towards the inner wall of the chamber 1 by the ancillary plates 9 arranged on the back face of the inclined plate 8. That is, when the molten glass 7 passes through the through-hole 12 and flows towards the back face of the inclined plate 8, the direction of flow thereof is changed to a direction different from that up to that point. For this reason, high stirring effect is obtained.

Likewise, even in a case in which the molten glass 7 is directed between two ancillary plates 9 having a mode for pushing the molten glass 7 from the shaft 5 towards the inner wall of the chamber 1, a portion of the molten glass 7 passes through the through-hole 12 and flows towards the back face of the inclined plate 8, while the remainder flows upward or downward along the principal surfaces of the inclined plate 8, creating flows in different directions and differing in velocity. Furthermore, the molten glass 7 having passed through the through-hole 12 and flowed towards the back face of the inclined plate 8 changes flow direction to a direction different from that up to that point, due to the ancillary plates 9 arranged on the back face of the inclined plate 8.

In preferred practice, the principal surfaces of the ancillary plates 9 are curving faces. During rotational running of the blades 6a to 6e centering on the shaft 5, if the principal surfaces of the ancillary plates 9 are curving faces, the resistance that the blades 6a to 6e receive from the molten glass 7 can be lower, and less power will be needed to give rise to the intended flow in the molten glass 7. Provided that it is possible for the ancillary plates 9 to create a flow in the radial direction of the shaft 5 in the molten glass 7, the principal surfaces of the ancillary plates 9 may be flat faces, or have other shapes.

In preferred practice, the blades 6e of the lowermost tier and the downstream conduit 4 are disposed in such a way that when an area formed between the inclined plates 8 of the blades 6e of the lowermost tier and the bottom face of the chamber 1 is hypothetically moved along a direction perpendicular to the axial direction of the shaft 5, and in a direction towards the downstream conduit 4, at least a portion of this area constitutes the boundary of the downstream conduit 4 and the chamber 1, and passes through an opening section formed in the side wall of the chamber 1. Also, in preferred practice, the ancillary plates 9 arranged on the lower principal surface of the blades 6e of the lowermost tier have a mode for pushing the molten glass 7 when the stirrer 2 rotates in one direction about the shaft 5 as the rotation axis.

Because the blades 6e of the lowermost tier and the downstream conduit 4 are disposed in the aforedescribed manner, the flow arising in the molten glass 7 due to the ancillary plates 9 arranged on the lower principal surface of the blades 6e of the lowermost tier readily affects the flow of molten glass 7 flowing out to the downstream conduit 4. Where the ancillary plates 9 arranged on the lower principal surface of the blades 6e of the lowermost tier have a mode of pushing the molten glass 7 when the stirrer 2 rotates about the shaft 5 as the rotation axis, the molten glass 7 can be directed from the shaft 5 towards the inner wall of the chamber 1, so that the molten glass 7 flows smoothly out from the chamber 1 into the downstream conduit 4. For this reason, the flow of molten glass 7 in the bottom part of the chamber 1 is smooth, and homogeneous stirring takes place.

In the stirring device 100 according to the aforedescribed embodiment, the upstream conduit 3 is arranged in the upper part of the chamber 1 and the downstream conduit 4 is arranged in the lower part of the chamber 1, with the molten glass 7 being directed downward from above in the chamber 1; however, there may also be employed a stirring device configured so that the molten glass 7 is directed upward from below in the chamber 1. Here, a downstream conduit (outlet pipe) may be arranged on the side wall in the top part of the chamber, and a upstream conduit (inlet pipe) may be arranged on the side wall in the bottom part of the chamber, with the chamber communicating respectively with the upstream conduit and the downstream conduit. Except for the aforedescribed points, the configuration is comparable to the stirring device 100 according to the aforedescribed embodiment.

Figure 19:
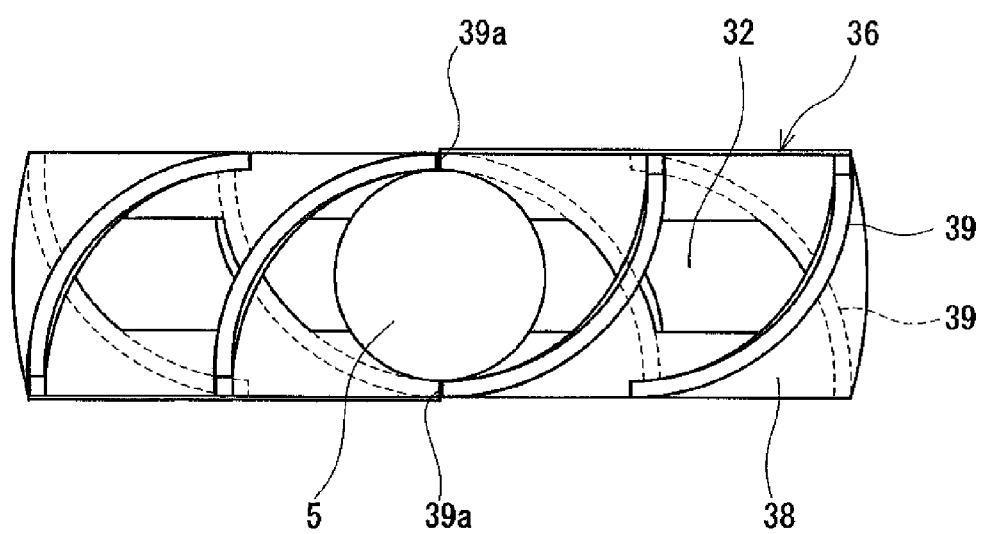
FIG. 19 is a plan view showing an example of a yet another blade configuration of the stirrer according to the second embodiment.

The ancillary plates 9 discussed above are configured as separate from the shaft 5, but a configuration whereby the ancillary plates 9 connect at one end to the shaft 5 is also acceptable. In so doing, the strength of the ancillary plates 9 can be improved. Furthermore, the strength of the inclined plates 8 can be improved as well. FIG. 19 is a plan view showing an example of a yet another blade configuration of the stirrer according to the present embodiment. A blade 36 shown in FIG. 19 has an inclined plate 38 connected to the side wall of the shaft 5, and ancillary plates 39 arranged on the principal surfaces of the inclined plate 8. A through-hole 32 is formed in the principal surfaces of the inclined plate 38. In this blade 36, an edge 39a of the ancillary plate 39 arranged towards the shaft 5 is connected to the shaft 5. By connecting the ancillary plate 39 to the shaft 5 in this way, the strength of the ancillary plate 39 and the inclined plate 38 can be improved, making it possible for the ancillary plate 39 and the inclined plate 38 to be thinner, so that the cost of the stirring device 100 can be reduced.

The temperature of the molten glass 7 stirred by the stirring device 100 is a high temperature on the order of 1400-1600° C. Therefore, members that come into contact with the molten glass 7, such as the upstream conduit 3, the downstream conduit 4, the chamber 1, and the stirrer 2, are preferably made of materials that can withstand such high temperature. For example, these members may be made of platinum, platinum alloy, iridium, iridium alloy, or the like. However, because platinum, platinum alloy, iridium, and iridium alloy are costly, it is preferable to minimize the amounts in which these are employed. The inclined plates 8 and/or the ancillary plates 9 are preferably made as thin as possible, within a range of having strength such that no difficulties are encountered in stirring the molten glass 7. Also, thinner inclined plates 8 and ancillary plates 9 have less resistance with the molten glass 7, and less power will be needed to give rise to the intended flow in the molten glass 7. In the chamber 1, the upstream conduit 3, and the downstream conduit 4, reduction in the amounts used of costly materials, such as platinum, may be achieved by forming platinum or the like only on those sections coming into contact with the molten glass 7. That is, multilayer structures having platinum or the like formed only on the inner wall thereof are acceptable.

Figure 20:
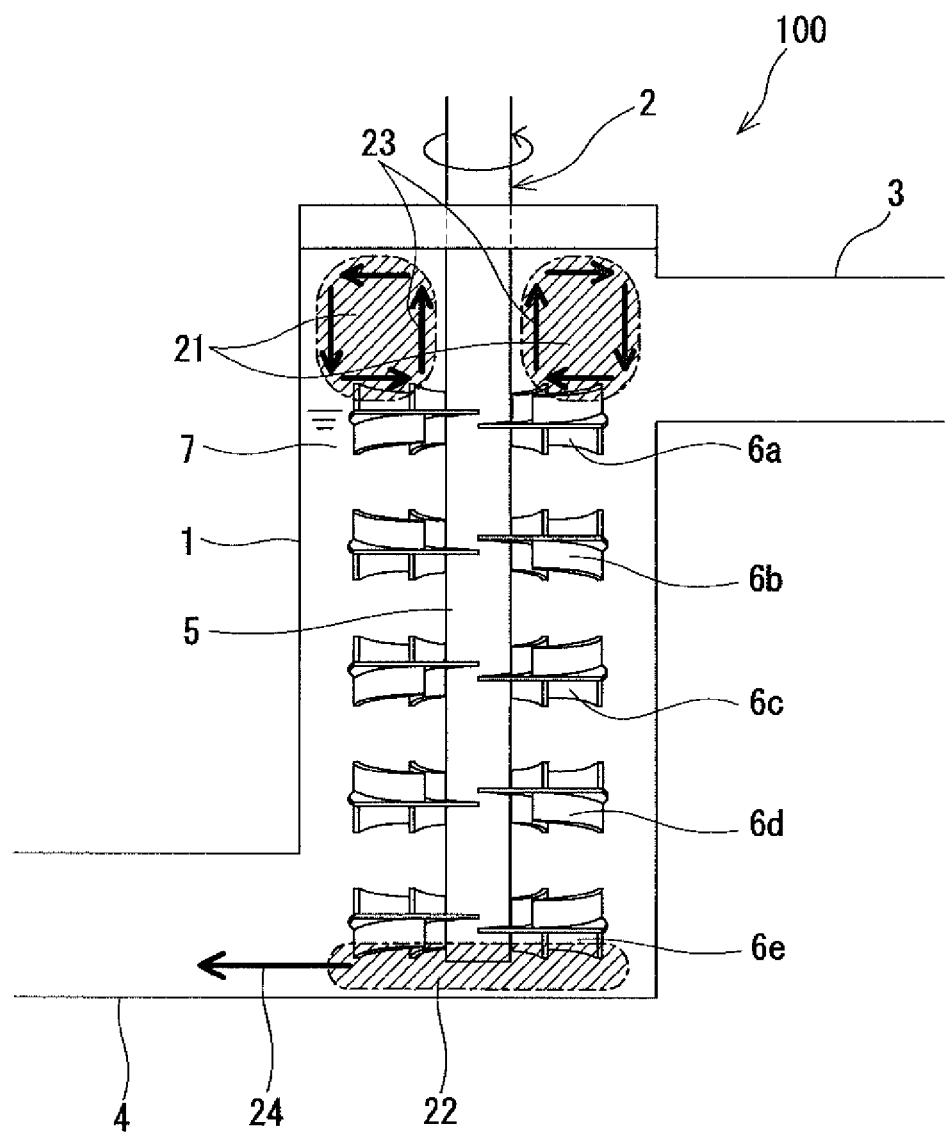
FIG. 20 is a diagram depicting flows of molten glass in the stirring device according to the second embodiment.

The operation of the stirring device 100 according to the present embodiment will be described with reference to FIG. 20. FIG. 20 is a diagram depicting flows of molten glass in the stirring device according to the present embodiment. Molten glass 7 flows into the chamber 1 from the upstream conduit 3. While not shown in the drawing, the upper end of the shaft 5 of the stirrer 2 is linked to a motor or the like, and the stirrer 2 rotates counterclockwise as seen from above, with the shaft 5 as the rotation axis. Inside the chamber 1, the molten glass 7 stirred by the stirrer 2 flows out from the chamber 1 and into the downstream conduit 4. Rotation of the stirrer 2 inside the chamber 1 causes the blades 6a to 6e to rotate about the shaft 5 as the rotation axis, stirring the molten glass 7.

Through rotation of the blades 6a to 6e, the molten glass 7 is pushed up or pushed down by each of the inclined plates 8. For this reason, an upward or downward flow arises in the molten glass 7. Additionally, due to rotation of the blades 6a to 6e, part of the molten glass 7 passes through the through-holes 12. For this reason, upward or downward flows in directions different from the flows produced by the inclined plates 8 arises in the molten glass 7. Furthermore, through rotation of the blades 6a to 6e, the molten glass 7 is raked from the inner wall of the chamber 1 towards the shaft 5, or pushed from the shaft 5 towards the inner wall of the chamber 1, by each of the ancillary plates 9. For this reason, flows in the radial direction of the shaft 5 arise in the molten glass 7. Because the aforedescribed multiple flows arise in the molten glass 7 in this manner, a sufficient stirring effect can be obtained, and more homogeneous stirring is possible.

As mentioned previously, the modes of the inclined plates 8 differ between respective combinations of the blade 6a and the blade 6b, the blade 6b and the blade 6c, the blade 6c and the blade 6d, and the blade 6d and the blade 6e, and this gives rise in the molten glass 7 to upward or downward flows in mutually different directions. For this reason, between the blade 6a and the blade 6b, between the blade 6b and the blade 6c, between the blade 6c and the blade 6d, and between the blade 6d and the blade 6e, upward flows and downward flows arise respectively, with these flows colliding in certain sections. In these sections, complex flows arise, and the stirring effect on the molten glass 7 is high. Due to the multiple flows and the existence of sections in which these flows collide, the stirring device 100 can stir the molten glass 7 more homogeneously.

In the aforedescribed embodiment, there exist a plurality of sections in which two different flows, i.e., upward flow and downward flow, arise; however, it will suffice if a section in which two different flows arise exists at a minimum of one location. Consequently, among combinations of mutually adjacent tiers on the shaft 5, it will suffice if at least one of the sets is a set of inclined plates 8 having mutually different modes.

In the stirring device 100, the upstream conduit 3 and the downstream conduit 4 are respectively arranged in the upper side wall and the lower side wall of the chamber 1, and therefore the direction of flow of the molten glass 7 changes between the upper part and the lower part of the chamber 1. In sections in which the direction of flow of the molten glass 7 changes, the molten glass 7 readily stagnates. In particular, the molten glass 7 does not readily flow at locations above the blade 6a positioned in the uppermost tier and below the blade 6e positioned in the lowermost tier, and it is conceivable that the molten glass 7 in the upper space 21 and the lower space 22 of the chamber 1 may not be sufficiently stirred, as compared with other sections.

The inclined plates 8 of the blade 6a have a mode of pushing the molten glass 7 downward, when the stirrer 2 rotates about the shaft 5 as the rotation axis, in the counterclockwise direction as viewed from above. The ancillary plates 9 arranged on the upper principal surfaces of the inclined plates 8 of the blade 6a have a mode for raking the molten glass 7 from the inner wall of the chamber 1 towards the shaft 5, when the stirrer 2 rotates about the shaft 5 as the rotation axis, in the counterclockwise direction as viewed from above. When the stirrer 2 rotates, flows arise in the molten glass 7 due to the inclined plates 8 and the ancillary plates 9, and synthesis of these flows gives rise to flow of the molten glass 7 upward in the vicinity of the shaft 5, and flow of the molten glass 7 downward in the vicinity of the inner wall of the chamber 1 (circulating flow) within the upper space 21. The flows constituting this circulating flow are shown by flow directions 23. Because of the circulating flow, the molten glass 7 is stirred and does not readily stagnate in the upper space 21.

Furthermore, the inclined plates 8 of the blade 6e have a mode of pushing the molten glass 7 downward, when the stirrer 2 rotates about the shaft 5 as the rotation axis, in the counterclockwise direction as viewed from above. The blade 6e gives rise to downward flow in the molten glass 7 in the lower space 22 of the chamber 1, and the molten glass 7 is stirred by collision with the bottom face of the chamber 1. The ancillary plates 9 are arranged to extend downward from the lower principal surfaces of the inclined plates 8 of the blade 6e. These ancillary plates 9 bring about sufficient stirring of the molten glass 7 of the lower space 22, and push the molten glass 7 from the shaft 5 towards the inner wall of the chamber 1, thereby giving rise in the molten glass 7 to flow towards the downstream conduit 4, as shown by a flow direction 24. For this reason, the molten glass 7 of the lower space 22 is sufficiently stirred, and is directed into the downstream conduit 4, without tending to stagnate.

As mentioned previously, complex flows arise in the molten glass 7 inside the chamber 1 of the stirring device 100. The amount of molten glass 7 flowing into the chamber 1 and the amount of molten glass 7 outflowing from the chamber 1 are constant amounts per unit time; however, due to the complex flows arising in the molten glass 7 in the chamber 1, the speed of flow in the chamber 1 differs by location.

As mentioned previously, according to the stirring device 100 of the present embodiment, the molten glass 7 can be stirred in more homogeneous fashion. For this reason, striae can be minimized, and glass articles of high quality can be obtained.

The inventors constructed a model of the stirring device according to the present embodiment, and performed stirring tests having parameters physically resembling those of actual operation of the stirring device. At this time, in place of molten glass, a transparent, high-viscosity material was employed, and a red liquid was continuously dripped therein from the upstream side of the high-viscosity material flowing into the chamber. The state of stirring could be more readily observed thereby. By dripping the red liquid, red streaks initially appeared along the flows in the high-viscosity material, but with stirring these red streaks disappeared, and the high-viscosity material turned a red color. The inventors performed tests employing a plurality of stirrers having different shapes, observing the state of stirring with each stirrer.

Employing a stirrer configured like the stirrer shown in FIG. 11 (Example 1), a state of stirring of the stirring device like that shown in FIG. 10 was observed. As a result, immediately after starting the test, red streaks swirling around the shaft were visible at the upstream (upper) side of the chamber, but with progression downstream (downward) and the passage of time, the entirety of high-viscosity material in the chamber turned a red color, and the red striations were diminished. The high-viscosity material outflowing to the downstream conduit had no color irregularities, and the high-viscosity material that had turned a red color overall outflowed to the downstream conduit. Consequently, sufficient stirring was considered achieved. According to this stirring device, the occurrence of striae is minimized, and homogeneous stirring can be considered to be achieved.

Employing a stirrer having a configuration comparable to the stirrer of the aforedescribed Example 1, except for having through-holes formed in the inclined plates (Example 2), the state of stirring was observed in a manner comparable to the aforedescribed. Furthermore, employing a stirrer having a configuration comparable to the stirrer of the aforedescribed Example 1, except that the ancillary plates arranged on the upper principal surfaces and lower principal surfaces of the inclined plates both had a mode of raking the high-viscosity material (Example 3), the state of stirring was observed in a manner comparable to the aforedescribed. As result, with the stirrers of both Example 2 and Example 3, like the stirrer of Example 1, red streaks swirling around the shaft were visible at the upstream side of the chamber, but with progression downstream or the passage of time, the entirety of high-viscosity material in the chamber turned a red color, and the red striations were diminished. The high-viscosity material outflowing to the downstream conduit had no color irregularities, and the high-viscosity material that had turned a red color overall outflowed to the downstream conduit. As compared with the stirrer of Example 1, the stirrers of Example 2 and Example 3 required a somewhat longer time for the entirety of high-viscosity material in the chamber to turn a red color. With the stirrers of both Example 2 and Example 3, sufficient stirring was considered achieved. In stirring devices provided with these stirrers, the occurrence of striae is minimized, and homogeneous stirring can be considered to be achieved.

As a comparative example, a stirrer in which all of the inclined plates had a mode of pushing the high-viscosity material downward was employed, and the state of stirring was observed in a manner comparable to the aforedescribed. Ancillary plates were arranged on both principal surfaces of the inclined plates. As a result, in the stirrer of the comparative example, with the stirrer of the comparative example, color irregularities arising in the high-viscosity material in the chamber remained, and the high-viscosity material failed to become colored in its entirety. In the high-viscosity material outflowing to the downstream conduit, a double-layer structure that was red on the upper side and a transparent on the lower side was visible, and it took considerable time for the entire high-viscosity material outflowing to the downstream conduit to become colored.

| REFERENCE SIGNS LIST | |
|---|---|
| 1, 101 | Chamber |
| 2, 102 | Stirrer |
| 3, 103 | Upstream conduit |
| 4, 104 | Downstream conduit |
| 5, 105 | Shaft |
| 7 | Molten glass |
| 6a-6e, 36 | Blade |
| 106a-106e | Blade |
| 8, 38 | Inclined plate (support plate) |
| 108 | Support plate |
| 9, 39, 109 | Ancillary plate |
| 119a | Upstream ancillary plate |
| 119b | Downstream ancillary plate |
| 9a, 9b, 39a | Edge |
| 109a | Inside edge |
| 109b | Outside edge |
| 10 | Face |
| 110 | Linking portion |
| 11, 111 | Straight line |
| 12, 32, 112 | Through-hole |
| 13, 113 | Center point |
| 21, 121 | Upper space |
| 22, 122 | Lower space |
| 23, 24, 123, 124 | Flow of molten glass |
| 40 | Melting tank |
| 41 | Fining tank |
| 42 | Molding device |
| 43a, 43b, 43c | Conduit |
| 44 | Glass ribbon |
| 100 | Stirring device |
| 200 | Glass manufacturing device |

CITATION LIST

Patent Literature (Patent Document 1) Japanese Unexamined Patent Application Publication S63-8226
(Patent Document 2) Japanese Unexamined Patent Application Publication S58-88126

The invention claimed is:

1. A method of manufacturing a glass substrate, comprising:
    a melting step melting a glass starting material and obtaining molten glass; a stirring step for stirring, inside a stirring vessel, the molten glass obtained in the melting step; and a molding step for molding a glass substrate from the molten glass stirred in the stirring step; wherein in the method of manufacturing a glass substrate,
    the stirring vessel is provided with a chamber for directing the molten glass downward from above, or upwardly from below, and a stirrer for stirring the molten glass inside the chamber;
    the stirrer has a shaft serving as a rotation axis disposed along the vertical direction, and blades disposed on a side face of the shaft, in a plurality of tiers from an uppermost tier to a lowermost tier along the axial direction of the shaft;
    the blades have support plates extending orthogonally to the axial direction of the shaft, and ancillary plates disposed on a principal face of the support plates; and
    in the stirring step, the stirrer rotates about the shaft as the rotation axis, whereby the ancillary plates create in the molten glass a flow in the radial direction of the shaft, and ancillary plates positioned between support plates of blades disposed in two adjacent tiers create, in the molten glass, a flow in the same direction,
    in the stirring step, at least one of the ancillary plates creates in the molten glass, along the support plate, a flow from the inner wall of the chamber towards the shaft, and at least one of the ancillary plates creates in the molten glass, along the support plate, a flow from the shaft towards the inner wall of the chamber.

2. The method of manufacturing a glass substrate as recited in claim 1, wherein
    the blades have the ancillary plates arranged on the upper principal faces and on the lower principal faces of the support plates; and
    in the stirring step, the stirrer rotates about the shaft as the rotation axis, thereby causing either the ancillary plates arranged on the upper principal faces of the support plates or the ancillary plates arranged on the lower principal faces of the support plates in the respective blades to create in the molten glass a flow from the inner wall of the chamber towards the shaft, and the other of either the ancillary plates arranged on the upper principal faces of the support plates or the ancillary plates arranged on the lower principal faces of the support plates in the respective blades to create, in the molten glass, a flow from the shaft towards the inner wall of the chamber.

3. The method of manufacturing a glass substrate as recited in claim 2, wherein
    the support plates are furnished in a radial pattern from the shaft towards the inner wall of the chamber; and are disposed such that, when the support plates of the blades disposed in two adjacent tiers are respectively projected onto the bottom face of the chamber, the gap between the respective support plates is small, or the surface area of a section where the respective support plates overlap is small.

4. The method of manufacturing a glass substrate as recited in claim 3, wherein
    a plurality of the support plates are furnished in a radial pattern; and
    each of the plurality of support plates is linked at the periphery of the shaft.

5. The method of manufacturing a glass substrate as recited in claim 4, wherein
    in the stirring step, the stirrer rotates about the shaft as the rotation axis, whereby the ancillary plates arranged on the upper principal faces of the support plates of the blade positioned in the uppermost tier create, upwardly from the support plates of the blade positioned in the uppermost tier, a first flow for moving the molten glass from the inner wall of the chamber towards the shaft, and a second flow for causing the molten glass moved by the first flow to ascend along a side wall of the shaft.

6. The method of manufacturing a glass substrate as recited in claim 3, wherein
    in the stirring step, the stirrer rotates about the shaft as the rotation axis, whereby the ancillary plates arranged on the upper principal faces of the support plates of the blade positioned in the uppermost tier create, upwardly from the support plates of the blade positioned in the uppermost tier, a first flow for moving the molten glass from the inner wall of the chamber towards the shaft, and a second flow for causing the molten glass moved by the first flow to ascend along a side wall of the shaft.

7. The method of manufacturing a glass substrate as recited in claim 2, wherein
    in the stirring step, the stirrer rotates about the shaft as the rotation axis, whereby the ancillary plates arranged on the upper principal faces of the support plates of the blade positioned in the uppermost tier create, upwardly from the support plates of the blade positioned in the uppermost tier, a first flow for moving the molten glass from the inner wall of the chamber towards the shaft, and a second flow for causing the molten glass moved by the first flow to ascend along a side wall of the shaft.

8. The method of manufacturing a glass substrate as recited in claim 1, wherein
    the support plates are furnished in a radial pattern from the shaft towards the inner wall of the chamber; and are disposed such that, when the support plates of the blades disposed in two adjacent tiers are respectively projected onto the bottom face of the chamber, the gap between the respective support plates is small, or the surface area of a section where the respective support plates overlap is small.

9. The method of manufacturing a glass substrate as recited in claim 8, wherein
    in the stirring step, the stirrer rotates about the shaft as the rotation axis, whereby the ancillary plates arranged on the upper principal faces of the support plates of the blade positioned in the uppermost tier create, upwardly from the support plates of the blade positioned in the uppermost tier, a first flow for moving the molten glass from the inner wall of the chamber towards the shaft, and a second flow for causing the molten glass moved by the first flow to ascend along a side wall of the shaft.

10. The method of manufacturing a glass substrate as recited in claim 8, wherein
    a plurality of the support plates are furnished in a radial pattern; and
    each of the plurality of support plates is linked at the periphery of the shaft.

11. The method of manufacturing a glass substrate as recited in claim 10, wherein
    in the stirring step, the stirrer rotates about the shaft as the rotation axis, whereby the ancillary plates arranged on the upper principal faces of the support plates of the blade positioned in the uppermost tier create, upwardly from the support plates of the blade positioned in the uppermost tier, a first flow for moving the molten glass from the inner wall of the chamber towards the shaft, and a second flow for causing the molten glass moved by the first flow to ascend along a side wall of the shaft.

12. The method of manufacturing a glass substrate as recited in claim 1, wherein in the stirring step, the molten glass between support plates of blades disposed in two adjacent tiers flows in the same direction as the flow created by ancillary plates positioned between the support plates.

13. A method of manufacturing a glass substrate, comprising:

a melting step melting a glass starting material and obtaining molten glass; a stirring step for stirring, inside a stirring vessel, the molten glass obtained in the melting step; and a molding step for molding a glass substrate from the molten glass stirred in the stirring step; wherein in the method of manufacturing a glass substrate, the stirring vessel is provided with a chamber for directing the molten glass downward from above, or upwardly from below, and a stirrer for stirring the molten glass inside the chamber;

the stirrer has a shaft serving as a rotation axis disposed along the vertical direction, and blades disposed on a side face of the shaft, in a plurality of tiers from an uppermost tier to a lowermost tier along the axial direction of the shaft;

the blades have support plates extending orthogonally to the axial direction of the shaft, and ancillary plates disposed on a principal face of the support plates; and in the stirring step, the stirrer rotates about the shaft as the rotation axis, whereby the ancillary plates create in the molten glass a flow in the radial direction of the shaft, in the stirring step, the stirrer rotates about the shaft as the rotation axis, whereby the ancillary plates arranged on the upper principal faces of the support plates of the blade positioned in the uppermost tier create, upwardly from the support plates of the blade positioned in the uppermost tier, a first flow that moves the molten glass from the inner wall of the chamber towards the shaft, and a second flow that moves the molten glass moved by the first flow up along a side wall of the shaft.

14. The method of manufacturing a glass substrate as recited in claim 13, wherein in the stirring step, the stirrer rotates about the shaft as the rotation axis, whereby the ancillary plates arranged on the upper principal faces of the support plates of the blade positioned in the uppermost tier further create, upwardly from the support plates of the blade positioned in the uppermost tier, a third flow that moves, in the proximity of the liquid level of the molten glass, the molten glass moved by the second flow from the shaft towards the inner wall of the chamber, and a fourth flow that moves the molten glass moved by the third flow down along the inner wall of the chamber.

15. The method of manufacturing a glass substrate as recited in claim 13, wherein in the stirring step, the molten glass has a viscosity of 2500 poise-450 poise.

16. A method of manufacturing a glass substrate, comprising:

a melting step for melting a glass starting material and obtaining molten glass; a stirring step for stirring, inside a stirring vessel, the molten glass obtained in the melting step; and a molding step for molding a glass substrate from the molten glass stirred in the stirring step; wherein in the method of manufacturing a glass substrate, the stirring vessel is provided with a chamber for directing the molten glass downward from above, or upwardly from below, and a stirrer for stirring the molten glass inside the chamber;

the stirrer has a shaft serving as a rotation axis disposed along the vertical direction, and blades disposed, on a side face of the shaft, in a plurality of tiers from an uppermost tier to a lowermost tier along the axial direction of the shaft;

the blades have support plates extending orthogonally to the axial direction of the shaft, and ancillary plates disposed on a principal face of the support plates; and in the stirring step, the stirrer rotates about the shaft as the rotation axis, whereby upwardly from the support plates of the blade positioned in the uppermost tier, the ancillary plates arranged on the upper principal face of the support plates of the blade positioned in the uppermost tier create a first flow for moving the molten glass towards the shaft from the inner wall of the chamber, and create a second flow causing the molten glass moved by the first flow to ascend along the side face of the shaft.

17. The method of manufacturing a glass substrate as recited in claim 16, wherein the chamber has a discharge port in the side wall, at a position above the blade positioned in the uppermost tier; and the discharge port discharges the molten glass from the chamber interior, at a heightwise location in proximity to the liquid level of the molten glass.

* * * * *